US010573038B2

(12) United States Patent
Gilbert et al.

(10) Patent No.: US 10,573,038 B2
(45) Date of Patent: *Feb. 25, 2020

(54) EDITING THE TEXT OF AN ARBITRARY GRAPHIC VIA A HIERARCHICAL LIST

(71) Applicant: Microsoft Technology Licensing, LLC, Redmond, WA (US)

(72) Inventors: Brent Gilbert, Woodinville, WA (US); Cynthia C. Shelly, Seattle, WA (US); Gary A. Pritting, Issaquah, WA (US); Kim Tapia St. Amant, Seattle, WA (US); Matthew J. Kotler, Kenmore, WA (US); Richard J. Wolf, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/251,175

(22) Filed: Aug. 30, 2016

(65) Prior Publication Data

US 2016/0371868 A1 Dec. 22, 2016

Related U.S. Application Data

(60) Division of application No. 13/933,390, filed on Jul. 2, 2013, now Pat. No. 9,489,359, which is a
(Continued)

(51) Int. Cl.
*G06T 11/60* (2006.01)
*G06F 17/24* (2006.01)
(Continued)

(52) U.S. Cl.
CPC ............ *G06T 11/60* (2013.01); *G06F 3/0482* (2013.01); *G06F 17/211* (2013.01);
(Continued)

(58) Field of Classification Search
CPC ...... G06T 11/206; G06T 11/60; G06F 17/243; G06F 17/24; G06F 3/0482; G06F 17/211; G06F 17/2235; G06F 17/2241
(Continued)

(56) References Cited

U.S. PATENT DOCUMENTS

| 4,531,150 A | 7/1985 | Amano |
| 4,686,522 A | 8/1987 | Hernandez et al. |

(Continued)

FOREIGN PATENT DOCUMENTS

| CN | 1530833 | 9/2004 |
| EP | 0 431 638 | 6/1991 |

(Continued)

OTHER PUBLICATIONS

Authoer et al. : IBM, Title: Methods for the Automatic Creation of PowerPoint Slides from Tagged Presentation Content, Published Mar. 12, 2004, IP.com No. IPCOM000022407D, 5 pages (Year: 2004).*

(Continued)

*Primary Examiner* — Ryan F Pitaro
*Assistant Examiner* — Henry Orr

(57) ABSTRACT

The present invention includes a graphics software program that automatically creates graphical content when a user creates or modifies a hierarchical list of content data and chooses from one of a plurality of graphical definition choices for the graphical elements. In addition, the present invention includes a user interface with three different displays. The first display presents the user with one or more galleries including a gallery with a plurality of graphical definitions. The second display is a content entry area. The final display is a drawing canvas.

20 Claims, 9 Drawing Sheets

Related U.S. Application Data continuation of application No. 10/957,103, filed on Sep. 30, 2004, now Pat. No. 8,510,657.

(51) Int. Cl.
*G06T 11/20* (2006.01)
*G06F 3/0482* (2013.01)
*G06F 17/21* (2006.01)
*G06F 17/22* (2006.01)

(52) U.S. Cl.
CPC ...... *G06F 17/2235* (2013.01); *G06F 17/2241* (2013.01); *G06F 17/24* (2013.01); *G06F 17/243* (2013.01); *G06T 11/206* (2013.01)

(58) Field of Classification Search
USPC .................................................. 715/763, 780
See application file for complete search history.

(56) References Cited

U.S. PATENT DOCUMENTS

| | | |
|---|---|---|
| 4,996,665 A | 2/1991 | Nomura |
| 5,214,755 A | 5/1993 | Mason |
| 5,426,729 A | 6/1995 | Parker |
| 5,509,112 A | 4/1996 | Doi et al. |
| 5,535,134 A | 7/1996 | Cohn et al. |
| 5,557,722 A | 9/1996 | DeRose et al. |
| 5,596,691 A | 1/1997 | Good et al. |
| 5,619,631 A * | 4/1997 | Schott ............... G06F 3/0481 345/440 |
| 5,649,216 A | 7/1997 | Sieber |
| 5,669,006 A | 9/1997 | Joskowicz et al. |
| 5,673,401 A | 9/1997 | Volk et al. |
| 5,732,229 A | 3/1998 | Dickinson |
| 5,818,447 A | 10/1998 | Wolf et al. |
| 5,867,386 A | 2/1999 | Hoffberg et al. |
| 5,872,867 A | 2/1999 | Bergen |
| 5,903,902 A * | 5/1999 | Orr ...................... G06F 17/211 715/202 |
| 5,909,220 A | 6/1999 | Sandow |
| 5,956,043 A | 9/1999 | Jensen |
| 5,956,737 A | 9/1999 | King et al. |
| 5,999,731 A | 12/1999 | Yellin et al. |
| 6,057,842 A | 5/2000 | Knowlton et al. |
| 6,057,858 A | 5/2000 | Desrosiers |
| 6,072,480 A | 6/2000 | Gorbet et al. |
| 6,081,816 A | 6/2000 | Agrawal |
| 6,161,098 A | 12/2000 | Wallman |
| 6,166,738 A | 12/2000 | Robertson et al. |
| 6,173,286 B1 | 1/2001 | Guttman et al. |
| 6,189,132 B1 | 2/2001 | Heng et al. |
| 6,204,849 B1 | 3/2001 | Smith |
| 6,204,859 B1 | 3/2001 | Jouppi et al. |
| 6,256,650 B1 | 7/2001 | Cedar et al. |
| 6,289,502 B1 | 9/2001 | Garland et al. |
| 6,289,505 B1 | 9/2001 | Goebel |
| 6,292,194 B1 | 9/2001 | Powel, III |
| 6,301,704 B1 | 10/2001 | Chow et al. |
| 6,305,012 B1 | 10/2001 | Beadle et al. |
| 6,308,322 B1 | 10/2001 | Serocki et al. |
| 6,320,602 B1 | 11/2001 | Burkhardt et al. |
| 6,324,686 B1 | 11/2001 | Komatsu et al. |
| 6,405,225 B1 | 6/2002 | Apfel et al. |
| 6,448,973 B1 | 9/2002 | Guo et al. |
| 6,456,305 B1 * | 9/2002 | Qureshi ............ G06F 17/30905 707/E17.121 |
| 6,593,933 B1 | 7/2003 | Xu et al. |
| 6,667,750 B1 | 12/2003 | Halstead et al. |
| 6,691,282 B1 | 2/2004 | Rochford et al. |
| 6,715,130 B1 | 3/2004 | Eiche et al. |
| 6,774,899 B1 | 8/2004 | Ryall et al. |
| 6,791,582 B2 | 9/2004 | Linsey et al. |
| 6,819,342 B2 | 11/2004 | Kitagawa et al. |
| 6,826,727 B1 * | 11/2004 | Mohr ................... G06F 17/211 382/180 |
| 6,826,729 B1 | 11/2004 | Giesen et al. |
| 6,941,478 B2 | 9/2005 | Card et al. |
| 6,944,830 B2 | 9/2005 | Card et al. |
| 6,956,737 B2 | 10/2005 | Chen et al. |
| 6,957,191 B1 | 10/2005 | Belcsak et al. |
| 7,055,095 B1 | 5/2006 | Anwar |
| 7,107,525 B2 | 9/2006 | Purvis |
| 7,178,102 B1 | 2/2007 | Jones et al. |
| 7,209,815 B2 | 4/2007 | Grier et al. |
| 7,231,602 B1 | 6/2007 | Trulove |
| 7,325,186 B2 | 1/2008 | Jones |
| 7,348,982 B2 | 3/2008 | Schorr et al. |
| 7,379,074 B2 | 5/2008 | Gerhard et al. |
| 7,406,660 B1 | 7/2008 | Sikchi |
| 7,423,646 B2 | 9/2008 | Saini et al. |
| 7,478,079 B2 | 1/2009 | Robertson |
| 7,743,325 B2 | 6/2010 | Berker et al. |
| 7,747,944 B2 | 6/2010 | Gerhard et al. |
| 7,750,924 B2 | 7/2010 | Berker |
| 8,134,575 B2 | 3/2012 | Wong et al. |
| 8,269,790 B2 | 9/2012 | Wong et al. |
| 8,438,486 B2 | 5/2013 | Waldman et al. |
| 8,799,325 B2 | 8/2014 | Callens et al. |
| 9,489,359 B2 | 11/2016 | Gilbert et al. |
| 9,514,105 B2 | 12/2016 | Callens et al. |
| 9,529,786 B2 | 12/2016 | Waldman et al. |
| 9,619,910 B2 | 4/2017 | Wong et al. |
| 2001/0032151 A1 * | 10/2001 | Paul ...................... G06F 17/24 705/26.1 |
| 2001/0035875 A1 | 11/2001 | Suzuki et al. |
| 2001/0051962 A1 | 12/2001 | Plotkin |
| 2002/0065852 A1 | 5/2002 | Hendrickson et al. |
| 2002/0107842 A1 | 8/2002 | Biebesheimer et al. |
| 2002/0111969 A1 | 8/2002 | Halstead, Jr. |
| 2002/0156808 A1 * | 10/2002 | Duffy .................. G06F 17/243 715/234 |
| 2003/0028562 A1 * | 2/2003 | Shaughnessy ........ G06F 17/243 715/234 |
| 2003/0065601 A1 | 4/2003 | Gatto |
| 2003/0069931 A1 | 4/2003 | Omura |
| 2003/0079177 A1 * | 4/2003 | Brintzenhofe ........ G06F 17/211 715/205 |
| 2003/0126136 A1 | 7/2003 | Omoigui |
| 2003/0218641 A1 | 11/2003 | Longobardi |
| 2004/0001106 A1 | 1/2004 | Deutscher et al. |
| 2004/0021647 A1 | 2/2004 | Iwema et al. |
| 2004/0041838 A1 | 3/2004 | Adusumilli et al. |
| 2004/0111672 A1 | 6/2004 | Bowman et al. |
| 2004/0133854 A1 | 7/2004 | Black |
| 2004/0145603 A1 | 7/2004 | Soares |
| 2004/0148571 A1 | 7/2004 | Lue |
| 2004/0205602 A1 | 10/2004 | Croeni |
| 2005/0001837 A1 | 1/2005 | Shannon |
| 2005/0007382 A1 | 1/2005 | Schowtka et al. |
| 2005/0034083 A1 | 2/2005 | Jaeger |
| 2005/0091584 A1 | 4/2005 | Bogdan et al. |
| 2005/0094206 A1 | 5/2005 | Tonisson |
| 2005/0094207 A1 | 5/2005 | Lo et al. |
| 2005/0132283 A1 | 6/2005 | Diwan et al. |
| 2005/0157926 A1 | 7/2005 | Moravec et al. |
| 2005/0216832 A1 | 9/2005 | Giannetti |
| 2005/0240858 A1 | 10/2005 | Croft et al. |
| 2005/0273730 A1 | 12/2005 | Card et al. |
| 2005/0289466 A1 * | 12/2005 | Chen .................... G11B 27/034 715/731 |
| 2006/0064642 A1 | 3/2006 | Iyer |
| 2006/0066627 A1 | 3/2006 | Gerhard et al. |
| 2006/0066631 A1 | 3/2006 | Schorr et al. |
| 2006/0066632 A1 | 3/2006 | Wong |
| 2006/0070005 A1 | 3/2006 | Gilbert |
| 2006/0209093 A1 | 3/2006 | Berker et al. |
| 2006/0212801 A1 | 9/2006 | Berker et al. |
| 2006/0277476 A1 | 12/2006 | Lai |
| 2006/0294460 A1 | 12/2006 | Chao et al. |
| 2007/0006073 A1 | 1/2007 | Gerhard et al. |
| 2007/0055939 A1 | 3/2007 | Furlong et al. |
| 2007/0112832 A1 | 5/2007 | Wong |
| 2007/0186168 A1 | 8/2007 | Waldman et al. |
| 2008/0046803 A1 | 1/2008 | Beauchamp et al. |

(56) References Cited

U.S. PATENT DOCUMENTS

| | | | |
|---|---|---|---|
| 2008/0136822 | A1 | 6/2008 | Schoor et al. |
| 2008/0178107 | A1 | 7/2008 | Lee et al. |
| 2008/0282147 | A1 | 11/2008 | Schoor |
| 2008/0288916 | A1 | 11/2008 | Tazoe |
| 2009/0019453 | A1 | 1/2009 | Kodaganur |
| 2009/0119577 | A1 | 5/2009 | Almbladh |
| 2009/0327954 | A1 | 12/2009 | Danton |
| 2011/0055687 | A1 | 3/2011 | Bhandar et al. |
| 2011/0225548 | A1 | 9/2011 | Callens et al. |
| 2012/0127178 | A1 | 5/2012 | Wong et al. |
| 2013/0024791 | A1 | 1/2013 | Wong et al. |
| 2013/0232410 | A1 | 9/2013 | Waldman et al. |
| 2013/0290839 | A1 | 10/2013 | Gilbert et al. |
| 2014/0289613 | A1 | 9/2014 | Callens et al. |
| 2014/0292767 | A1 | 10/2014 | Schorr et al. |
| 2017/0060827 | A1 | 3/2017 | Waldman et al. |
| 2017/0193683 | A1 | 7/2017 | Wong et al. |
| 2017/0301122 | A1 | 10/2017 | Schorr et al. |

FOREIGN PATENT DOCUMENTS

| | | |
|---|---|---|
| EP | 1 111 543 | 6/2001 |
| EP | 1 111 543 | 11/2002 |
| EP | 1643450 | 5/2012 |
| JP | 04-130585 | 5/1992 |
| JP | 06-309128 | 11/1994 |
| JP | H09-109351 | 4/1997 |
| JP | 2001-500294 | 1/2001 |
| JP | 2002507289 | 3/2002 |
| JP | 2002507301 | 3/2002 |
| JP | 2003-052582 | 2/2003 |
| JP | 2003044464 | 2/2003 |
| JP | 2004-220561 | 8/2004 |
| JP | 2005-275890 | 12/2005 |
| JP | 2006-506713 | 2/2006 |
| KR | 10-1999-0029911 | 4/1999 |
| KR | 10-1999-0034152 | 5/1999 |
| KR | 10-2004-0041979 | 5/2004 |
| KR | 10-2004-0048236 | 6/2004 |
| KR | 1020040073870 | 8/2004 |
| MX | 277871 | 7/2010 |
| RU | 2127449 | 3/1999 |
| RU | 2142162 | 11/1999 |
| RU | 2218602 | 12/2003 |
| TW | 578067 | 3/2004 |
| TW | 200406734 | 5/2004 |
| WO | 198200726 | 3/1982 |
| WO | 1995/00916 | 1/1995 |
| WO | 199855953 | 10/1998 |
| WO | 1999/24267 | 5/1999 |
| WO | 2001/39019 | 11/2000 |
| WO | 2001/039019 | 5/2001 |
| WO | 01/80044 | 10/2001 |
| WO | WO 0237206 A2 * | 5/2002 |
| WO | 03/052582 | 6/2003 |
| WO | 2004/046972 | 6/2004 |

OTHER PUBLICATIONS

"Show Me Microsoft Office Powerpoint 2003" by Steve Johnson, Perspection, Inc., Publisher: Que, Publication Date: Oct. 2, 2003, Print ISBN-10; 0-7897-3009-X, 530 pgs. (Year: 2003).*

"Create Diagrams in Word 2002, Excel 2002, and Powerpoint 2002"; http://office.microsoft.com/en-usassistance/HA-010346141033.aspx.; 2 pages.

"De Mail reader," downloaded Mar. 24, 2009, 2 pages, URL: http://de.openoffice.org/services/ReadMMsg?list=annouce&msg. No translation available, 2 pgs.

"Internet as a Source of Prior Art," downloaded Mar. 16, 2009 from Wikipedia, 3 pages. URL: http//en.wikipedia.org/wiki/Internet_as_a_source_of_prior_art, downloaded Mar. 24, 2009 (In German) 3 pages.

"OpenOffice.org 1.0.3.1 in deutsch veroffentlicht," downloaded Mar. 24, 2009, (in German), 4 pages.

"OpenOffice.org," downloaded Mar. 24, 2009; 19 pages. "OpenOffice.org," downloaded Mar. 24, 2009 (as cited as D8 in the Minutes from Oral Proceedings dated Jun. 8, 2009—in German, no translation available); URL: http://www.000-portal.de/modules.pnp?op=modload&name=News&, 19 pgs.

"Exploring the Layouts", 1999 software Publishing Corporation, 2 pgs.

"Proquis Compliance Management & Document Control Solutions"; http://wwws.proquis.com/allclear-text2chart.asp, 1 page.

"Show Me Microsoft® Office Powerpoint® 2003" by Steve Johnson, Perspection, Inc., Publisher: Que, Publication Date: Oct. 2, 2003, Print ISBN-10; 0-7897-3009-X; Print ISBN-13: 978-0-7897-3009-1, 4 pgs.

A. C. Beers et al., "Rendering from Compressed Textures," Proceedings of SIGGRAPH '96, Aug. 1996, 4 pgs.

A. Fournier et al., "Computer Rendering of Stochastic Models," Communications of the ACM, Jun. 1982, vol. 25, No. 6, pp. 371-384.

About assigning columns in data files to custom property fileds, Microsoft Office Online. Copyright 2006 Microsoft Corporation. [Last Accessed: Apr. 27, 2006], 1 pg.

About breaking your organization chart across multiple pages, Microsoft Office Online. Copyright 2006 Microsoft Corporation. [Last Accessed: Apr. 27, 2006], 1 pg.

About charts, Microsoft Office Online. Copyright 2006 Microsoft Corporation. [Last Accessed: Apr. 27, 2006], 3 pgs.

About choosing actions and events for organization chart shapes, Microsoft Office Online. Copyright 2006 Microsoft Corporation. [Last Accessed: Apr. 27, 2006], 1 pg.

About choosing data file columns, Microsoft Office Online. Copyright 2006 Microsoft Corporation. [Last Accessed: Apr. 27, 2006], 1 pg.

About combination charts, Microsoft Office Online. Copyright 2006 Microsoft Corporation. [Last Accessed: Apr. 27, 2006], 1 pg.

About defining a new ODBC data source, Microsoft Office Online. Copyright 2006 Microsoft Corporation. [Last Accessed: Apr. 27, 2006], 1 pg.

About importing data, Microsoft Office Online. Copyright 2006 Microsoft Corporation. [Last Accessed: Apr. 27, 2006], 3 pgs.

About mapping fields from your data file to a Gantt chart, Microsoft Office Online. Copyright 2006 Microsoft Corporation. [Last Accessed: Apr. 27, 2006], 1 pg.

About Microsoft Visual Basic .NET code to UML mapping, Microsoft Office Online. Copyright 2006 Microsoft Corporation. [Last Accessed: Apr. 27, 2006], 3 pgs.

About Microsoft Visual C# code to UML mapping, Microsoft Office Online. Copyright 2006 Microsoft Corporation. [Last Accessed: Apr. 27, 2006), 3 pgs.

About Microsoft Visual C++ 7.0 code to UML mapping, Microsoft Office Online. Copyright 2006 Microsoft Corporation. [Last Accessed: Apr. 27, 2006], 3 pgs.

About ODBC data sources and organization charts, Microsoft Office Online. Copyright 2006 Microsoft Corporation. [Last Accessed: Apr. 27, 2006], 1 pg.

About OLAP source data in PivotTable and PivotChart reports, Microsoft Office Online. Copyright 2006 Microsoft Corporation. [Last Accessed: Apr. 27, 2006], 3 pgs.

About Organization Chart Wizard data, Microsoft Office Online. Copyright 2006 Microsoft Corporation. [Last Accessed: Apr. 27, 2006]1 pg.

About PivotTable and PivotChart source data, Microsoft Office Online. Copyright 2006 Microsoft Corporation. [Last Accessed: Apr. 27, 2006], 3 pgs.

About PivotTable reports, Microsoft Office Online. Copyright 2006 Microsoft Corporation. [Last Accessed: Apr. 27, 2006], 2 pgs.

About reverse engineering code to the UML, Microsoft Office Online. Copyright 2006 Microsoft Corporation. [Last Accessed: Apr. 27, 2006], 1 pg.

About selecing delimiters in a Gantt Chart, Microsoft Office Online. Copyright 2006 Microsoft Corporation. [Last Accesssed: Apr. 27, 2006], 1 pg.

(56) References Cited

OTHER PUBLICATIONS

About using Microsoft Query to retrieve external data, Microsoft Office Online, Copyright 2006 Microsoft Corporation. [Last Accessed: Apr. 27, 2006], 3 pgs.
Add, link, edit, or remove title in a chart, Microsoft Office Online. Copyright 2006 Microsoft Corporation. [Last Accessed: Apr. 27, 2006], 2 pgs.
Advanced Timeline Options dialog box, Microsoft Office Online. Copyright 2006 Microsoft Corporation. [Last Accessed: Apr. 27, 2006], 1 pg.
Anonymous: "Extract of Online-Help for OpenOffice Impress (Stylist), Ver. 1.1.5, German Version," online! Apr. 2004, 2 pgs.
Australian Examiner's First Report dated Apr. 21, 2010 cited in Application No. 2005203708, 2 pgs.
Australian Examiner's First Report filed in Application No. 2005202720, dated Apr. 22, 2010; 2 pages.
Australian Examiner's Second Report filed in Application No. 2005202720, dated Aug. 30, 2010; 2 pages.
Australian Notice of Allowance in Application 2005202720 dated Feb. 10, 2011, 3 pgs.
Australian Notice of Allowance in Application 2005203708 dated Jun. 23, 2010, 3 pgs.
Australian Notice of Allowance in Application 2005203711 dated Nov. 9, 2010, 3 pgs.
Australian Office Action in Application 2005203711 dated Apr. 23, 2010, 2 pgs.
Available chart types, Microsoft Office Online. Copyright 2006 Microsoft Corportaion. [Last Accessed: Apr. 27, 2006], 7 pgs.
Borland, Russell "Running Microsoft Word 97", 1997, Published by Microsoft Press, Pertinent pp. 60-61.
Bugfix-Release OpenOffice 1.0.3.1, Erschienen (Update), no English translation, Apr. 23, 2003, 1 page.
Canadian Notice of Allowance in Application 2511037, dated May 29, 2013, 1 page.
Canadian Notice of Allowance in Application 2517409, dated Sep. 20, 2013, 1 page.
Canadian Office Action in Application 2511037, dated Nov. 14, 2012, 3 pgs.
Canadian Office Action in Application 2517399, dated Mar. 22, 2013, 2 pgs.
Canadian Office Action in Application 2517409, dated Feb. 11, 2013, 6 pgs.
Canadian Office Action in Application 2517409, dated Sep. 19, 2012, 6 pgs.
Casex Annex, dated Apr. 11, 2010 (cited in email communication from European Examiner on May 12, 2011 in European Application 05105366.8); 1 page.
Change Date and Time Formats dialog box, Microsoft Office Online. Copyright 2006 Microsoft Corporation. [Last Accessed: Apr. 7, 2006], 1 pg.
Change Mapping dialog box, Microsoft Office Online. Copyright 2006 Microsoft Corporation. [Last Accessed: Apr. 27, 2006], 1 pg.
Chart Wizard, Microsoft Office Online. Copyright 2006 Microsoft Corporation. [Last Accessed: Apr. 27, 2006], 4 pgs.
Chinese 1st Office Action in Application 200510088525.6 dated May 9, 2008, 18 pgs.
Chinese 1st Office Action in Application 200510099124.0 dated Jun. 20, 2008, 19 pgs.
Chinese 2nd Office Action in Application 200510088525.6 dated Nov. 7, 2008, 10 pgs.
Chinese 2nd Office Action in Application 200510099124.0 dated Dec. 26, 2008, 9 pgs.
Chinese 2nd Office Action in Application 201010587370.1, dated Mar. 12, 2012, 8 pgs.
Chinese 3rd Office Action in Application 200510088525.6 dated Feb. 27, 2009, 9 pgs.
Chinese 3rd Office Action in Application 200510099124.0 dated Apr. 17, 2009, 16 pgs.
Chinese 3rd Office Action in Application 201010587370.1, dated Aug. 8, 2013, 8 pgs.
Chinese Decision on Re-Examination in Application 201010587370.1, dated Apr. 7, 2013, 2 pgs.
Chinese Final Rejection in Application 201010587370.1, dated Sep. 5, 2012, 6 pgs.
Chinese First Office Action in Application 201010587370.1, dated Sep. 8, 2011, 8 pgs.
Chinese Fourth Office Action cited in Application No. 200510099124.0, dated Sep. 4, 2009, 7 pages.
Chinese Notice of Allowance in Application 200510088525.6 dated Jul. 17, 2009, 4 pgs.
Chinese Notice of Allowance in Application 200510099124.0 dated Sep. 15, 2010, 4 pgs.
Chinese Notice of Allowance in Application 2006100044984 dated Jan. 22, 2010, 2 pgs.
Chinese Notice of Allowance in Application No. 200510099652.6, dated Dec. 26, 2008, 4 pgs.
Chinese Office Action dated Aug. 29, 2008 cited in Application No. 2006100044498.4, 15 pgs.
Chinese Office Action dated Jul. 4, 2008 cited in Application No. 200510099652.6, 9 pgs.
Chinese Patent Office Sixth [sic—Fifth] Office Action cited in Application No. 200510099124.0, dated May 10, 2010, 6 pages.
Chinese Second Office Action dated Feb. 20, 2009 cited in Application No. 2006100044498.4, 19 pgs.
Chinese Third Office Action dated Jun. 19, 2009 cited in Application No. 2006100044498.4, 9 pgs.
Chou-Zukai, "Excel 2002, Windows XP General Edition", pp. 210-225 (2002) (cited in Japanese Patent Application No. 2005-187817, no translation available), in Japanese language, 18 pgs.
Configure Interval dialog box, Microsoft Office Online. Copyright 2006 Microsoft Corporation. [Last Accessed: Apr. 27, 2006], 1 pg.
Configure Milestone dialog box, Microsoft Office Online. Copyright 2006 Microsoft Corporation. [Last Accessed: Apr. 27, 2006], 1 pg.
Configure Timeline dialog box (Time Format tab), Microsoft Office Online. Copyright 2006 Microsoft Corporation. [Last Accessed: Apr. 27, 2006], 1 pg.
Configure Timeline dialog box (Time Period tab), Microsoft Office Online. Copyright 2006 Microsoft Corporation. [Last Accessed: Apr. 27, 2006] 1 pg.
Configure Working Time dialog box, Microsoft Office Online. Copyright 2006 Microsoft Corporation. [Last Accessed: Apr. 27, 2006], 1 pg.
Create a chart from data in a PivotTable report, Microsoft Office Online. Copyright 2006 Microsoft Corporation. [Last Accessed: Apr. 27, 2006], 1 pg.
Create a chart, Microsoft Office Online. Copyright 2006 Microsoft Corporation. [Last Accessed: Apr. 27, 2006], 2 pgs.
Create a Gantt chart in Excel, Microsoft Office Online. Copyright 2006 Microsoft Corporation. [Last Accessed: Apr. 27, 2006], 2 pgs.
Create a PivotChart report, Microsoft Office Online. Copyright 2006 Microsoft Corporation. [Last Accessed: Apr. 27, 2006], 3 pgs.
Create a PivotTable report, Microsoft Office Online. Copyright 2006 Microsoft Corporation. [Last Accessed: Apr. 27, 2006], 2 pgs.
Creating a Bubble chart, Microsoft Office Online. Copyright 2006 Microsoft Corporation. [Last Accessed: Apr. 27, 2006, ]2 pgs.
Creating a Stock chart, Microsoft Office Online. Copyright 2006 Microsoft Corporation. [Last Accessed: Apr. 27, 2006], 2 pgs.
Creating a Surface chart, Microsoft Office Online. Copyright 2006 Microsoft Corporation. [Last Accessed: Apr. 27, 2006], 3 pgs.
Creating Pie of Pie and Bar of Pie charts, Microsoft Office Online. Copyright 2006 Microsoft Corporation. [Last Accessed: Apr. 27, 2006], 3 pgs.
Css Zen Garden, "The Beauty in CSS Design", retrieved from Archive.org. <http://web.archive.org/web/20031001180317/http://www.csszengarden.com/>, Oct. 1, 2003. Retrieved Nov. 8, 2009, 3 pgs.
D. J. Heeger et al., "Pyramid-Based Texture Analysis/Synthesis," pp. 1-10.
D. R. Peachey, "Solid Texturing of Complex Surfaces," Computer Graphics, vol. 19, No. 3, Jul. 1985, pp. 279-286.

(56) References Cited

OTHER PUBLICATIONS

DeBonet, JS, "Multiresolution Sampling Procedure for Analysis and Synthesis of Texture Images", Learning & Vision Group, Artificial Intelligence Laboratory, Massachusetts Institute of Technology, 8 pgs.
Diagram, Oxford English Dictionary, 2nd Edition (1989), Oxford University Press 1989, downloaded from http://www.oed.com/oed/00063080 (cited in email communication from European Examiner on May 12, 2011 in European Application 05105366.8); 2 pgs.
Diagramm—Wikipedia (in German), downloaded from http://de.wikipedia.org/wiki/Diagramm (cited in email communication from European Examiner on May 12, 2011 in European Application 05105366.8); 10 pgs.
European Brief Communication in Application 06111105.0, dated Sep. 17, 2012, 10 pgs.
European Communication dated Dec. 17, 2008 cited in Application No. 06111105.0, 8 pgs.
European Communication dated Jul. 10, 2009 cited in Application No. 06111105.0, 6 pgs.
European Decision to Refuse a European Application dated Jun. 12, 2009 in Application No. 05108636.1, 39 pages.
European Decision to Refuse in EP Application 06111105.0, dated Oct. 5, 2012, 27 pgs.
European E-mail communication from European Examiner cited in EP Application 05105366.8 dated May 12, 2011, 2 pgs.
European Exam Report in EP Application 05105366.8 dated Apr. 30, 2009, 9 pgs.
European Extended Search Report for EP 05 10 8636.1-2218, dated Jan. 2, 2006, 7 pgs.
European Minutes from Oral Proceedings, dated Jun. 8, 2009, in EP Application No. 05108636.1, 42 pages.
European Minutes of the Sep. 27, 2012 Oral Proceedings in EP Application 06111105.0, mailed Oct. 5, 2012, 3 pgs.
European Notice of Allowance in Application 05105366.8 dated Jun. 21, 2011, 6 pgs.
European Official Communication in EP Application 051086361 dated Jun. 1, 2007, 7 pgs.
European Oral Summons in EP Application 06111105.0, dated May 15, 2012, 10 pgs.
European Search Report dated Feb. 13, 2006 cited in Application 05108658.5, 7 pgs.
European Search Report for EP 05105366.8, dated Jan. 2, 2006, 3 pgs.
Example of a reverse-engineered solution: FM Stocks, Microsoft Office Online. Copyright 2006 Microsoft Corporation. [Last Accessed: Apr. 27, 2006], 1 pg.
Export a SharePoint list to a spreadsheet, Microsoft Office Online. Copyright 2006 Microsoft Corporation. [Last Accessed: Apr. 27, 2006], 2 pgs.
Five ways to subtotal values in repeating data, Microsoft Office Online. Copyright 2006 Microsoft Corporation. [Last Accessed: Apr. 27, 2006], 5 pgs.
Gallant, John and Bergevin, Holly, Archive.org archive of "CSS Flyouts—Part One," [online] Jun. 24, 2005 [accessed Nov. 13, 2006], CommunityMX, Retrieved from Internet <URL:http://web.archive.org/web/20050624075147/http://www.communitymx.com/content/article.cfm?page=3&cid=55A69>, 2 pgs.
Gantt Chart Options dialog box (Date tab), Microsoft Office Online. Copyright 2006 Microsoft Corporation. [Last Accessed: Apr. 27, 2006], 1 pg.
Gantt Chart Options dialog box (Format tab), Microsoft Office Online. Copyright 2006 Microsoft Corporation. [Last Accessed: Apr. 27, 2006], 1 pg.
H.G. Schuster, "Deterministic Chaos, An Introduction," Second Revised Edition, pp. 200-207.
Heise Online: "OpenOffice 1.1.5 verfüugbar" downloaded Jul. 28, 2010 (as cited as D5 in the Minutes from Oral Proceedings dated Jun. 8, 2009—in German, URL: http://www.heise.de/newsticker/meldung/OpenOffice-1-1-5-verfuegbar-130148.html English translation attached); 2 pages.
Insert Column dialog box, Microsoft Office Online. Copyright 2006 Microsoft Corporation. [Last Accessed: Apr. 27, 2006], 1 pg.
Intelligent User Interfaces: Components of Intelligent Interfaces. http://web.cs.wpl.edu/Research/airgllntlntlintint-paper-components.html [Last Accessed: Nov. 30, 2005], 4 pgs.
Interactive information visualization. http://prefuse.sourceforge.net/ [Last Accessed: Nov. 30, 2005].
Isayama, K.' "SMI Edicolor 5", Mac Power, vol. 12, No. 4, pp. 134-135, Apr. 1, 2001, 7 pgs.
J. Torborg et al., "Talisman: Commodity Realtime 3D Graphics for the PC," Proceedings of SIGGRAPH 1996, 11 pgs.
J.P. Lewis, "Algorithms for Solid Noise Synthesis," Computer Graphics, vol. 23, No. 3, Jul. 1989, pp. 263-270.
Jan Smith, "Jan's PowerPoint Advanced: Images", pp. 7 and 8. obtained online on Mar. 12, 2008 at: http://web.archive.org/web/2005020822247/http://www.jegsworks.com/Lessons/presentations/advanced/images.htm, 9 pgs.
Japanese Final Notice of Rejection dated Aug. 10, 2011 in Application 2006-064583, 3 pgs.
Japanese Final Notice of Rejection in Application 2011-245199, dated Sep. 7, 2012, 4 pgs.
Japanese Final Rejection and Translation Summary in Application 2006064583, dated Dec. 1, 2011, 4 pgs.
Japanese Notice of Allowance in Application 2011-160788, dated Aug. 21, 2012, 4 pgs.
Japanese Notice of Allowance in Application 2011-245199, dated Jul. 17, 2013, 4 pgs.
Japanese Notice of Allowance in JP Application 2005-275890, dated Oct. 5, 2011, 5 pgs.
Japanese Notice of Rejection in Application 2011-245199, dated Apr. 16, 2012, 3 pgs.
Japanese Office Action dated Apr. 12, 2011 cited in JP Application 2005-253627, 5 pgs.
Japanese Official Notification of patent published in Official Gazette in Application 2005-187817, dated Dec. 7, 2011, 32 pgs.
Japanese Patent Office Notice of Rejection cited in Application No. 2005187817, dated Nov. 11, 2010; 5 pages.
Japanese Patent Office Notice of Rejection cited in Application No. 2005275890, dated Nov. 18, 2010; 9 pages.
K. Perlin, "An Image Synthesizer," Computer Graphics, vol. 19, No. 3, Jul. 1985, pp. 287-296.
Keyboard shortcuts, Microsoft Office Online. Copyright 2006 Microsoft Corporation. [Last Accessed: Apr. 27, 2006], 17 pgs.
Korean Final Notice of Rejection in Application 10-2005-0057172, dated Aug. 29, 2012, 2 pgs.
Korean Notice of Final Rejection in Application 10-2005-00738480, dated Apr. 30, 2012, 6 pgs.
Korean Notice of Preliminary Rejection and Translation Summary in Application 10200573848, dated Dec. 12, 2011, 6 pgs.
Korean Notice of Preliminary Rejection dated Feb. 23, 2012 cited in Application No. 10-2006-0007338, 6 pgs.
Korean Notice of Preliminary Rejection in Application 1020050073710, dated Jan. 31, 2012, 1 pg. English translation.
Korean Notice of Preliminary Rejection in Application 10-2005-57172, dated Jan. 25, 2012, 1 pg. English translation.
Korean Preliminary Rejection (English translation), Application 102006-0007338, dated Feb. 23, 2012, 2 pgs.
LingCh by Elod Csirmaz—Retrieved Date: Jan. 11, 2010, http://www.postminart.org/csirmaz/lingch.txt., 5 pgs.
Linuxforen.de, "OpenOffice.org 1.0.3.1 in deutsch veröffentlicht," downloaded Mar. 24, 2009 (as cited as D6 in the Minutes from Oral Proceedings dated Jun. 8, 2009—in German, no translation available); 3 pages.
M. Cox et al., "Multi-Level Texture Caching for 3D Graphics Hardware," In Proceedings of the 25th International Symposium on Computer Architecture, 1998, pp. 86-97.
M. Pharr et al., "Rendering Complex Scenes with Memory-Coherent Ray Tracing," Proceedings of SIGGRAPH 1997, pp. 1-8.
Malaysian Adverse Report in Application PI20054064, dated Jan. 15, 2013, 2 pgs.
Malaysian Adverse Report in Application PI20054064, dated Nov. 15, 2011, 3 pgs.

(56) References Cited

OTHER PUBLICATIONS

Malaysian Examination Report in Application PI 20054063, dated Sep. 15, 2011, 3 pgs.
Mexican Office Action dated Dec. 4, 2008 cited in Application No. PA/a/2005/009276 (not in English), 4 pgs.
Mexican Office Action dated May 25, 2009 cited in Application No. PA/a/2005/009276, 10 pgs.
Microsoft Office PowerPoint 2003 11.6564.6568 with Service Pack 2, Part of Microsoft Office Professional Edition 2003, 9 pgs.
Microsoft Office Word 2003 11.6568.6568 with Service Pack 2, Part of Microsoft Office Professional Edition 2003, 7 pgs.
Minoru Sendagi, "Word 2003 Perfect Master, Windows XP Kanzentaiou", pp. 500-507, 2003, 10 pgs.
Modeling exponential growth, Microsoft Office Online. Copyright 2006 Microsoft Corporation. [Last Accessed: Apr. 27, 2006], 2 pgs.
Online Training Solutions, Inc et al., "Microsoft Office PowerPoint 2003 Step by Step", Microsoft Press, Aug. 27, 2003, 105 pgs.
Outline a list of data in a worksheet, Microsoft Office Online. Copyright 2006 Microsoft Corporation. [Last Accessed: Apr. 27, 2006], 14 pgs.
Overview of security and protection in Excel, Microsoft Office Online. Copyright 2006 Microsoft Corporation. [Last Accessed: Apr. 27, 2006], 4 pgs.
P. Hanrahan et al., "A Language for Shading and Lighting Calculations," Computer Graphics, vol. 24, No. 4, Aug. 1990, pp. 289-298.
PivotTable and PivotChart Wizard, Microsoft Office Online. Copyright 2006 Microsoft Corporation. [Last Accessed: Apr. 27, 2006], 3 pgs.
PivotTable reports 101, Microsoft Office Online. Copyright 2006 Microsoft Corporation. [Last Accessed: Apr. 27, 2006], 11 pgs.
PivotTable terminology demystified, Microsoft Office Online. Copyright 2006 Microsoft Corporation. [Last Accessed: Apr. 27, 2006], 4 pgs.
R.L. Cook et al., "The Reyes Image Rendering Architecture," Computer Graphics, vol. 21, No. 4, Jul. 1987, pp. 95-102.
Reverse engineer Visual Studio .NET source code, Microsoft Office Online. Copyright 2006 Microsoft Corporation. [Last Accessed: Apr. 27, 2006], 1 pg.
Reverse engineered code in the Model Explorer tree view, Microsoft Office Online. Copyright 2006 Microsoft Corporation. [Last Accessed: Apr. 27, 2006], 2 pgs.
Roth, et al. "SageTools: An Intelligent Environment for Sketching, Browsing, and Customizing Data-Graphics". School of Computer Science. Carnegie Mellon University. Proceedings CHI'95 Human Factors in Computing Systems, ACM, May 1995, 2 pgs.
Russian Notice of Allowance in Application 2005130349 dated Oct. 30, 2009, 7 pgs.
Russian Notice of Allowance in Application 2005130361 dated Oct. 7, 2009, 16 pgs.
Russian Notice of Allowance in RU application 2005120365 dated Oct. 6, 2009, 4 pgs.
Screen Shots (Examiner generated) taken on Mar. 18, 2010 of Microsoft PowerPoint 2002, publicly released Mar. 5, 2001); cited in U.S. Appl. No. 11/013,655, 6 pgs.
Screen shots of Microsoft PowerPoint, 2002, (in U.S. Appl. No. 11/013,655, filed Jan. 9, 2009), 15 pgs.
Screen shots of Microsoft PowerPoint, 2002, taken at Oct. 9, 2010, 6 pgs.
Show or hide a chart legend or data table, Microsoft Office Online. Copyright 2006 Microsoft Corporation. [Last Accessed: Apr. 27, 2006], 2 pgs.
Singleton, Roderick, "OpenOffice.org User Guide for Version 1.1. X", May 7, 2004, Online, XP002348571; retrieved from the Internet: URL:www.openoffice.org>, retrieved Sep. 30, 2005; pp. 253-284.
Statistica, StatSoft User Interface, http://www.statsoft.com/uniquefeatureslinterface.html (Last Accessed: Nov. 30, 2005), 6 pgs.
Styling Nested Lists, [online] Oct. 19, 2003 [accessed Nov. 13, 2006], SimpleBits, LLC, Retrieved from Internet<URL:http://www.simplebits.com/notebook/2003/10/19/styling_nested_lists.html./> pp. 1-5.
Synchronize Interval dialog box, Microsoft Office Online. Copyright 2006 Microsoft Corporation. [Last Accessed: Apr. 27, 2006], 1 pg.
Synchronize Milestone dialog box, Microsoft Office Online. Copyright 2006 Microsoft Corporation. [Last Accessed: Apr. 27, 2006], 1 pg.
Tony Apodoca, "Using RenderMan in Animation Production," SIGGRAPH 1995, Course 4, Monday Aug. 7, 1995, 41 pgs.
Taiwan Notice of Allowance in Application 94126264, dated Jun. 10, 2013, 4 pgs.
Taiwan Notice of Allowance in Application 94127756, dated Aug. 23, 2012, 4 pgs.
Taiwan Search Report in Application 094127756, dated Jan. 3, 2012, 1 pg.
The University of Alberta, "PowerPoint Basics", pp. 1 and 7. obtained online on Mar. 6, 2008 at: http://web.archive.org/web/20050207083815/http://www.quasar.ualberta.ca/edpy202/tutorial/PowerPointIpptBasics/pptBasics.htm, 17 pgs.
Top tips for Excel: Charts and graphics, Microsoft Office Online. Copyright 2006 Microsoft Corporation. [Last Accessed: Apr. 27, 2006], 2 pgs.
Troubleshoot charts, Microsoft Office Online. Copyright 2006 Microsoft Corporation. [Last Accessed: Apr. 27, 2006], 11 pgs.
"Troubleshoot OLAP cubes", Microsoft Office Online. Copyright 2006 Microsoft Corporation. [Last Accessed: Apr. 27, 2006], 3 pgs.
Troubleshoot PivotChart reports, Microsoft Office Online. Copyright 2006 Microsoft Corporation. [Last Accessed: Apr. 27, 2006], 7 pgs.
Troubleshoot PivotTable reports, Microsoft Office Online. Copyright 2006 Microsoft Corporation. [Last Accessed: Apr. 27, 2006], 7 pgs.
U.S. Appl. No. 09/578,574, Office Action dated Oct. 23, 2001, 16 pgs.
U.S. Appl. No. 10/955,271, Advisory Action dated Jan. 9, 2007, 3 pgs.
U.S. Appl. No. 10/957,103, Advisory Action dated Jan. 17, 2008, 3 pgs.
U.S. Appl. No. 10/957,103, Amendment and Response filed Jan. 23, 2008, 19 pgs.
U.S. Appl. No. 10/957,103, Amendment and Response filed Nov. 18, 2009, 28 pgs.
U.S. Appl. No. 10/957,103, Amendment and Response filed Nov. 23, 2010, 23 pgs.
U.S. Appl. No. 10/957,103, Amendment and Response filed Dec. 12, 2008, 17 pgs.
U.S. Appl. No. 10/957,103, Amendment and Response filed Dec. 14, 2012, 14 pgs.
U.S. Appl. No. 10/957,103, Amendment and Response filed Dec. 26, 2007, 18 pgs.
U.S. Appl. No. 10/957,103, Amendment and Response filed Mar. 22, 2013, 16 pgs.
U.S. Appl. No. 10/957,103, Amendment and Response filed Apr. 14, 2009, 24 pgs.
U.S. Appl. No. 10/957,103, Amendment and Response filed May 3, 2013, 3 pgs.
U.S. Appl. No. 10/957,103, Amendment and Response filed Jun. 15, 2010, 24 pgs.
U.S. Appl. No. 10/957,103, Amendment and Response filed Jun. 17, 2008, 16 pgs.
U.S. Appl. No. 10/957,103, Amendment and Response filed Jun. 22, 2012, 28 pgs.
U.S. Appl. No. 10/957,103, Amendment and Response filed Jul. 8, 2011, 21 pgs.
U.S. Appl. No. 10/957,103, Amendment and Response filed Aug. 16, 2007, 17 pgs.
U.S. Appl. No. 10/957,103, Amendment filed Jan. 27, 2012, 26 pgs.
U.S. Appl. No. 10/957,103, Final Office Action dated Sep. 27, 2011, 19 pgs.

(56) References Cited

OTHER PUBLICATIONS

U.S. Appl. No. 10/957,103, Notice of Allowance dated Oct. 5, 2012, 5 pgs.
U.S. Appl. No. 10/957,103, Notice of Allowance dated Apr. 11, 2013, 7 pgs.
U.S. Appl. No. 10/957,103, Office Action dated Jan. 3, 2013, 7 pgs.
U.S. Appl. No. 10/957,103, Office Action dated Feb. 22, 2012, 19 pgs.
U.S. Appl. No. 10/957,103, Office Action dated Apr. 13, 2011, 19 pgs.
U.S. Appl. No. 11/013,630, Office Action dated Jan. 22, 2008, 2 pgs.
U.S. Appl. No. 11/013,630, Petition dated Mar. 17, 2008, 2 pgs.
U.S. Appl. No. 11/013,630, Petition Decision dated Mar. 18, 2008, 1 page.
U.S. Appl. No. 11/013,630, Petition Decision dated Jul. 21, 2008, 1 page.
U.S. Appl. No. 11/013,655, Amendment and Response filed Jan. 24, 2011, 16 pgs.
U.S. Appl. No. 11/013,655, Amendment and Response filed Oct. 14, 2008, 14 pgs.
U.S. Appl. No. 11/013,655, Amendment and Response filed Nov. 18, 2009, 15 pgs.
U.S. Appl. No. 11/013,655, Amendment and Response filed May 11, 2009, 17 pgs.
U.S. Appl. No. 11/013,655, Amendment and Response filed Aug. 11, 2008, 13 pgs.
U.S. Appl. No. 11/013,655, Amendment and Response filed Aug. 24, 2010, 21 pgs.
U.S. Appl. No. 11/013,655, Notice of Allowance dated Jan. 7, 2011, 5 pgs.
U.S. Appl. No. 11/013,655, Office Action dated Oct. 25, 2010, 15 pgs.
U.S. Appl. No. 11/081,323, Advisory Action dated Sep. 18, 2007, 3 pgs.
U.S. Appl. No. 11/081,324, Amendment Communication dated Aug. 12, 2009, 2 pgs.
U.S. Appl. No. 11/081,324, Amendment Communication dated Aug. 4, 2009, 2 pgs.
U.S. Appl. No. 11/081,324, Amendment Communication dated Sep. 11, 2009, 2 pgs.
U.S. Appl. No. 11/081,324, Petition dated Oct. 5, 2009, 1 page.
U.S. Appl. No. 11/351,341, Amendment and Response filed Oct. 19, 2009, 14 pgs.
U.S. Appl. No. 11/351,341, Amendment and Response filed Dec. 12, 2012, 9 pgs.
U.S. Appl. No. 11/351,341, Amendment and Response filed Mar. 2, 2011, 11 pgs.
U.S. Appl. No. 11/351,341, Amendment and Response filed Apr. 14, 2009, 18 pgs.
U.S. Appl. No. 11/351,341, Amendment and Response filed Jul. 2, 2012, 21 pgs.
U.S. Appl. No. 11/351,341, Amendment and Response filed Jul. 7, 2010, 17 pgs.
U.S. Appl. No. 11/351,341, Amendment and Response filed Sep. 12, 2011, 16 pgs.
U.S. Appl. No. 11/351,341, Notice of Allowance dated Jan. 2, 2013, 22 pgs.
U.S. Appl. No. 11/351,341, Notice of Allowance dated Oct. 22, 2012, 21 pgs.
U.S. Appl. No. 11/351,341, Office Action dated Jan. 7, 2010, 32 pgs.
U.S. Appl. No. 11/351,341, Office Action dated Feb. 3, 2012, 34 pgs.
U.S. Appl. No. 11/351,341, Office Action dated Mar. 20, 2008, 18 pgs.
U.S. Appl. No. 11/351,341, Office Action dated May 12, 2011, 25 pgs.
U.S. Appl. No. 11/351,341, Office Action dated Aug. 7, 2009, 24 pgs.
U.S. Appl. No. 11/351,341, Office Action dated Sep. 2, 2010, 32 pgs.
U.S. Appl. No. 12/035,878, Amendment and Response filed Jan. 28, 2011, 14 pgs.
U.S. Appl. No. 12/035,878, Amendment and Response filed Nov. 28, 2011, 15 pgs.
U.S. Appl. No. 12/035,878, Amendment and Response filed Feb. 21, 2013, 14 pgs.
U.S. Appl. No. 12/035,878, Amendment and Response filed Apr. 26, 2012, 14 pgs.
U.S. Appl. No. 12/035,878, Amendment and Response filed Jul. 14, 2011, 14 pgs.
U.S. Appl. No. 12/035,878, Amendment and Response filed Aug. 21, 2012, 15 pgs.
U.S. Appl. No. 12/035,878, Amendment and Response filed Sep. 5, 2013, 14 pgs.
U.S. Appl. No. 12/035,878, Final Office Action dated Nov. 26, 2012, 32 pgs.
U.S. Appl. No. 12/035,878, Final Office Action dated Apr. 14, 2011, 28 pgs.
U.S. Appl. No. 12/035,878, Office Action dated Jan. 27, 2012, 27 pgs.
U.S. Appl. No. 12/035,878, Office Action dated Oct. 28, 2010, 30 pgs.
U.S. Appl. No. 12/035,878, Office Action dated Nov. 8, 2013, 35 pgs.
U.S. Appl. No. 12/035,878, Office Action dated May 15, 2012, 37 pgs.
U.S. Appl. No. 12/035,878, Office Action dated May 28, 2013, 31 pgs.
U.S. Appl. No. 12/035,878, Office Action dated Aug. 26, 2011, 27 pgs.
U.S. Appl. No. 12/723,127, Amendment and Response filed Nov. 6, 2012, 14 pgs.
U.S. Appl. No. 12/723,127, Amendment and Response filed Jun. 26, 2012, 17 pgs.
U.S. Appl. No. 12/723,127, Notice of Allowance dated Dec. 17, 2013, 11 pgs.
U.S. Appl. No. 12/723,127, Notice of Allowance dated Aug. 8, 2013, 9 pgs.
U.S. Appl. No. 12/723,127, Office Action dated Feb. 27, 2012, 19 pgs.
U.S. Appl. No. 12/723,127, Office Action dated Aug. 6, 2012, 23 pgs.
U.S. Appl. No. 13/362,879, Notice of Allowance dated May 14, 2012, 5 pgs.
U.S. Appl. No. 10/955,271 Office Action dated Apr. 17, 2007, 16 pgs.
U.S. Appl. No. 10/955,271, Amendment and Response filed Jan. 16, 2007, 12 pgs.
U.S. Appl. No. 10/955,271, Amendment and Response filed Dec. 4, 2006, 14 pgs.
U.S. Appl. No. 10/955,271, Amendment and Response filed Jul. 24, 2006, 13 pgs.
U.S. Appl. No. 10/955,271, Amendment and Response filed Jul. 31, 2007, 16 pgs.
U.S. Appl. No. 10/955,271, Notice of Allowance dated Oct. 12, 2007, 7 pgs.
U.S. Appl. No. 10/955,271, Notice of Allowance dated Dec. 14, 2007, 12 pgs.
U.S. Appl. No. 10/955,271, Office Action dated Apr. 20, 2006, 10 pgs.
U.S. Appl. No. 10/955,271, Office Action dated Oct. 3, 2006, 12 pgs.
U.S. Appl. No. 10/957,103, Office Action dated Feb. 18, 2010, 18 pgs.
U.S. Appl. No. 10/957,103, Office Action dated Jul. 21, 2009, 24 pgs.
U.S. Appl. No. 10/957,103, Final Office Action dated Aug. 31, 2010, 19 pages.
U.S. Appl. No. 10/957,103, Office Action dated Jan. 14, 2009, 22 pgs.
U.S. Appl. No. 10/957,103, Office Action dated Mar. 19, 2008, 20 pgs.

(56) References Cited

OTHER PUBLICATIONS

U.S. Appl. No. 10/957,103, Office Action dated May 16, 2007, 16 pgs.
U.S. Appl. No. 10/957,103, Office Action dated Oct. 23, 2007, 25 pgs.
U.S. Appl. No. 10/957,103, Office Action dated Sep. 12, 2008, 25 pgs.
U.S. Appl. No. 11/013,630, Amendment and Response filed Jan. 31, 2007, 13 pgs.
U.S. Appl. No. 11/013,630, Notice of Allowance dated Mar. 16, 2007, 7 pgs.
U.S. Appl. No. 11/013,630, Notice of Allowance dated Jul. 26, 2007, 4 pgs.
U.S. Appl. No. 11/013,630, Office Action dated Oct. 31, 2006, 10 pgs.
U.S. Appl. No. 11/013,655, Notice of Allowance dated Jan. 17, 2012, 5 pgs.
U.S. Appl. No. 11/013,655, Notice of Allowance dated Jan. 30, 2012, 2 pgs.
U.S. Appl. No. 11/013,655, Office Action dated Apr. 9, 2008, 18 pgs.
U.S. Appl. No. 11/013,655, Office Action dated Aug. 19, 2009, 20 pgs.
U.S. Appl. No. 11/013,655, Office Action dated Jan. 9, 2009, 16 pgs.
U.S. Appl. No. 11/013,655, Office Action dated May 25, 2010, 31 pgs.
U.S. Appl. No. 11/081,323, Advisory Action dated Oct. 31, 2008, 3 pgs.
U.S. Appl. No. 11/081,323, Amendment and Response filed Oct. 29, 2007, 11 pgs.
U.S. Appl. No. 11/081,323, Amendment and Response filed Apr. 20, 2007, 14 pgs.
U.S. Appl. No. 11/081,323, Amendment and Response filed Apr. 23, 2008, 11 pgs.
U.S. Appl. No. 11/081,323, Amendment and Response filed May 18, 2009, 13 pgs.
U.S. Appl. No. 11/081,323, Amendment and Response filed Sep. 18, 2008, 13 pgs.
U.S. Appl. No. 11/081,323, Amendment and Response filed Sep. 6, 2007, 12 pgs.
U.S. Appl. No. 11/081,323, Notice of Allowance dated Dec. 1, 2009, 4 pgs.
U.S. Appl. No. 11/081,323, Notice of Allowance dated Dec. 16, 2009, 4 pgs.
U.S. Appl. No. 11/081,323, Notice of Allowance dated Feb. 23, 2010, 4 pgs.
U.S. Appl. No. 11/081,323, Notice of Allowance dated Aug. 13, 2009, 6 pgs.
U.S. Appl. No. 11/081,323, Notice of Allowance dated Sep. 18, 2009, 2 pgs.
U.S. Appl. No. 11/081,323, Office Action dated Jan. 23, 2008, 9 pgs.
U.S. Appl. No. 11/081,323, Office Action dated Feb. 18, 2009, 12 pgs.
U.S. Appl. No. 11/081,323, Office Action dated Jan. 22, 2007, 10 pgs.
U.S. Appl. No. 11/081,323, Office Action dated Jul. 18, 2008, 13 pgs.
U.S. Appl. No. 11/081,323, Office Action dated Jul. 6, 2007, 11 pgs.
U.S. Appl. No. 11/081,324, Advisory Action dated Jan. 29, 2009, 3 pgs.
U.S. Appl. No. 11/081,324, Advisory Action dated Feb. 29, 2008, 3 pgs.
U.S. Appl. No. 11/081,324, Amendment and Response dated Jan. 26, 2009, 17 pgs.
U.S. Appl. No. 11/081,324, Amendment and Response dated Feb. 11, 2008, 15 pgs.
U.S. Appl. No. 11/081,324, Amendment and Response dated Sep. 12, 2008, 15 pgs.
U.S. Appl. No. 11/081,324, Amendment and Response dated Sep. 28, 2007, 16 pgs.
U.S. Appl. No. 11/081,324, Notice of Allowance dated Nov. 30, 2009, 6 pgs.
U.S. Appl. No. 11/081,324, Notice of Allowance dated Mar. 5, 2010, 6 pgs.
U.S. Appl. No. 11/081,324, Notice of Allowance dated Jun. 10, 2009, 12 pgs.
U.S. Appl. No. 11/081,324, Office Action dated Dec. 11, 2007, 15 pgs.
U.S. Appl. No. 11/081,324, Office Action dated Jun. 29, 2007, 16 pgs.
U.S. Appl. No. 11/081,324, Office Action dated May 12, 2008, 15 pgs.
U.S. Appl. No. 11/081,324, Office Action dated Nov. 26, 2008, 18 pgs.
U.S. Appl. No. 11/172,279, Advisory Action dated Oct. 24, 2008, 3 pgs.
U.S. Appl. No. 11/172,279, Advisory Action dated Aug. 23, 2007, 3 pgs.
U.S. Appl. No. 11/172,279, Amendment and Response dated Jan. 11, 2010, 21 pgs.
U.S. Appl. No. 11/172,279, Amendment and Response dated Oct. 16, 2008, 14 pgs.
U.S. Appl. No. 11/172,279, Amendment and Response dated Nov. 19, 2007, 9 pgs.
U.S. Appl. No. 11/172,279, Amendment and Response dated Feb. 18, 2009, 14 pgs.
U.S. Appl. No. 11/172,279, Amendment and Response dated Feb. 27, 2007, 12 pgs.
U.S. Appl. No. 11/172,279, Amendment and Response dated Jun. 6, 2008, 11 pgs.
U.S. Appl. No. 11/172,279, Amendment and Response dated Jul. 28, 2009, 21 pgs.
U.S. Appl. No. 11/172,279, Amendment and Response dated Aug. 17, 2007, 9 pgs.
U.S. Appl. No. 11/172,279, Final Office Action dated Aug. 19, 2008, 11 pgs.
U.S. Appl. No. 11/172,279, Final Office Action dated May 17, 2007, 13 pgs.
U.S. Appl. No. 11/172,279, Notice of Allowance dated Apr. 2, 2010, 8 pgs.
U.S. Appl. No. 11/172,279, Office Action dated Apr. 29, 2009, 13 pgs.
U.S. Appl. No. 11/172,279, Office Action dated Mar. 6, 2008, 11 pgs.
U.S. Appl. No. 11/172,279, Office Action dated Nov. 12, 2009, 19 pgs.
U.S. Appl. No. 11/172,279, Office Action dated Nov. 27, 2006, 11 pgs.
Using charts and diagrams in the classroom, Microsoft Office Online. Copyright 2006 Microsoft Corporation. [Last Accessed: Apr. 27, 2006], 5 pgs.
Using Excel 2003 with earlier versions of Excel, Microsoft Office Online. Copyright 2006 Microsoft Corporation. [Last Accessed: Apr. 27, 2006], 4 pgs.
V.I. Arnold et al., "Ergodic Problems of Classical Mechanics," W.A. Benjamin, Inc., pp. v-ix & pp. 1-51.
Visio 2003 Bible, Chapter 10 (pp. 187-202), Chapter 12 (pp. 223-238), Chapter 13 (pp. 239-252) and Chapter 14 (pp. 253-270), copyright 2004 by Wiley Publishing Company; 69 pgs.
Where is the Chart menu?, Microsoft Office Online. Copyright 2006 Microsoft Corporation. [Last Accessed: Apr. 27, 2006], 1 pg.
Word Windows XP 2003, Microsoft Office 2003 Edition, no English translation, 10 pgs.
Work with Visio UML model diagrams in Visual Studio .NET', Microsoft Office Online. Copyright 2006 Microsoft Corporation. [Last Accessed: Apr. 27, 2006), 1 pg.
Y. Xu et al., "Chaos-Based Texture Synthesis," Visual Computing Group, Microsoft Research China, pp. 1-9.
YEd Graph Editor—Published Date: 2009; New yEd version 3.4.1, http://www.yworks.com/en/products_yed_about.html, 5 pgs.
Young, Michael J., "Microsoft Office System Inside Out"—2003 Edition, Michael Halvorson, 2003, p. 267.

(56) References Cited

OTHER PUBLICATIONS

Canadian Report in Application 2517399, dated Nov. 29, 2013, 4 pgs.
Malaysian Notice of Allowance in Application PI 20054064, dated Oct. 31, 2013, 2 pgs.
Eunsoon Choi, "A Study on Instruction for Statistics & Probability through Excel Utilization" published on Aug. 2002 as a master's thesis submitted to the graduate school of education, no English translation available, Silla University, Korea, 75 pgs.
Korean Notice of Preliminary Rejection in Application (with English translation), in Application 10-2005-73848, dated Nov. 18, 2013, 8 pgs.
Malaysian Notice of Allowance in Application PI 20054063, dated Jul. 15, 2013, 2 pgs.
U.S. Appl. No. 12/035,878, Amendment and Response filed Feb. 10, 2014, 15 pgs.
U.S. Appl. No. 12/035,878, Notice of Allowance dated Mar. 14, 2014, 10 pgs.
U.S. Appl. No. 12/723,127, Notice of Allowance dated Feb. 28, 2014, 8 pgs.
Chinese Notice of Allowance in Application 201010587370.1, dated Feb. 13, 2014, 4 pgs.
Russian Notice of Allowance in Application 2010100807, dated Jan. 31, 2014, 6 pgs.
U.S. Appl. No. 12/035,878, Amendment filed Apr. 22, 2014, 3 pgs.
U.S. Appl. No. 12/723,127, Amendment filed Apr. 22, 2014, 1 pg.
Canadian Notice of Allowance in Application 2517399, dated Sep. 5, 2014, 2 pgs.
Indian Office Action in Application 2284/DEL/2005, dated Feb. 17, 2015, 2 pgs.
U.S. Appl. No. 13/621,614, Office Action dated Jun. 26, 2015, 6 pgs.
U.S. Appl. No. 13/855,386, Office Action dated Jul. 14, 2015, 20 pgs.
"Show Me Microsoft Office Powerpoint 2003" by Steve Johnson, Perspection, Inc., Publisher: Que, Publication Date: Oct. 2, 2003, Print ISBN-10; 0-7897-3009-X, 530 pgs.
U.S. Appl. No. 13/621,614, Amendment and Response filed Sep. 28, 2015, 9 pgs.
U.S. Appl. No. 13/855,386, Amendment and Response filed Oct. 14, 2015, 12 pgs.
U.S. Appl. No. 14/296,023, Office Action dated Dec. 10, 2015, 13 pgs.
U.S. Appl. No. 13/933,390, Office Action dated Feb. 2, 2016, 13 pgs.
U.S. Appl. No. 13/621,614, Office Action dated Jan. 29, 2016, 4 pgs.
U.S. Appl. No. 14/296,023, Amendment and Response filed Mar. 10, 2016, 14 pgs.
U.S. Appl. No. 13/855,386, Office Action dated Mar. 21, 2016, 12 pgs.
U.S. Appl. No. 13/621,614, Amendment and Response filed Apr. 14, 2016, 9 pgs.
U.S. Appl. No. 13/933,390, Amendment and Response filed May 2, 2016, 20 pgs.
U.S. Appl. No. 13/621,614, Notice of Allowance dated May 23, 2016, 5 pgs.
U.S. Appl. No. 13/933,390, Notice of Allowance dated Jun. 21, 2016, 7 pgs.
U.S. Appl. No. 14/296,023, Notice of Allowance dated Jun. 22, 2016, 8 pgs.
U.S. Appl. No. 13/855,386, Amendment and Response filed Jun. 21, 2016, 12 pgs.
U.S. Appl. No. 14/296,023, Amendment and Response filed Aug. 29, 2016, 9 pgs.
U.S. Appl. No. 13/855,386, Notice of Allowance dated Aug. 12, 2016, 11 pgs.
Wenwen, D. et al., "Hierarchical Topics: Visually Exploring Large Text Collections Using Topic Hierarchies", Dec. 2013, IEEE, vol. 19, No. 12, pp. 2002-2011.
Mighlani, D. et al., "Intelligent Hierarchical Layout Segmentation of Document Images on the Basis of Colour Content", Dec. 1997, IEEE Tencon, pp. 191-194.
U.S. Appl. No. 13/933,390, Amendment after Allowance filed Aug. 4, 2016, 7 pgs.
U.S. Appl. No. 13/933,390, USPTO Response to Amendment dated Aug. 16, 2016, 2 pgs.
U.S. Appl. No. 13/933,390, Amendment after Allowance filed Aug. 26, 2016, 11 pgs.
U.S. Appl. No. 14/296,023, USPTO Response dated Sep. 9, 2016, 2 pgs.
U.S. Appl. No. 13/621,614, Amendment after Allowance filed Aug. 4, 2016, 9 pgs.
U.S. Appl. No. 13/621,614, USPTO Response dated Sep. 2, 2016, 2 pgs.
U.S. Appl. No. 13/855,386, USPTO Response dated Sep. 9, 2016, 2 pgs.
U.S. Appl. No. 13/855,386, Notice of Allowance dated Sep. 22, 2016, 2 pgs.
U.S. Appl. No. 13/621,614, Notice of Allowance dated Dec. 9, 2016, 5 pgs.
U.S. Appl. No. 14/307,668, Office Action dated Dec. 20, 2016, 19 pgs.
U.S. Appl. No. 14/307,668, Notice of Allowance dated Jul. 25, 2017, 4 pgs.
Indian Hearing Notice on Indian Application 2126/DEL/2005, dated Aug. 4, 2017, 2 pages.
Brazilian Office Action in Application PI0503982-7, dated Jul. 18, 2017, 10 pages.
Taiwan Office Action and Search Report Issued in Taiwan Patent Application No. 94126264, dated Mar. 12, 2012, 5 Pages.
"Timeline", Retrieved from <<http://almende.github.io/chap-links-library/timeline.html>>, Retrieved on Apr. 13, 2013, 2 Pages.
"Notice of Allowance Issued in U.S. Appl. No. 11/081,323", dated Sep. 16, 2009, 3 Pages. (we had cited Sep. 18, 2009, above—typo).
Notice of Allowance Issued in Japanese Patent Application No. 2005-253627, dated Jan. 6, 2012, 4 Pages.
Indian Notice of Allowance in Application 2126/DEL/2005, dated Sep. 18, 2017, 1 page.
U.S. Appl. No. 14/307,668, Notice of Allowance dated Apr. 25, 2017, 8 pgs.
Indian Office Action in Application 1572/DEL/2005, dated May 31, 2017, 8 pgs.
Brazilian Office Action in Application PI0503878-2, dated May 29, 2017, 14 pages.
Indian Office Action in Application 0343/DEL/2006, dated May 31, 2017, 11 pages, (0067 family).
Brazil Office Action in Application PI0502558-3, dated Jan. 26, 2017, 7 pgs.
U.S. Appl. No. 13/621,614, Amendment after Allowance filed Jan. 10, 2017, 9 pgs.
U.S. Appl. No. 13/621,614, USPTO Response dated Jan. 20, 2017, 2 pgs.
U.S. Appl. No. 13/855,386, 312 Amendment filed Aug. 26, 2016, 3 pages.
Indian Office Action in Application 2126/DEL/2005, dated Jan. 25, 2017, 9 pgs.
European Office Action Issued in Patent Application No. 05108658.5, dated Nov. 8, 2006, 7 Pages.
U.S. Appl. No. 09/482,285, Office Action dated Mar. 14, 2002, 10 Pages.
Mexican Patent Office Action cited in Application No. PA/a/2005/009276, dated May 3, 2010, 11 pages (with Eng. Trans).
Japanese Office Action Issued in Patent Application No. 2005-253627, dated Dec. 1, 2010, 6 Pages (with English translation).
Japanese Notice of Rejection Issued in Patent Application No. 2006-064583, dated Apr. 20, 2011, 3 Pages (with Eng. Trans).
U.S. Appl. No. 14/307,668, Amendment and Response filed Mar. 20, 2017, 18 pgs.
"Non Final Office Action Issued in U.S. Appl. No. 15/467,065", dated Aug. 3, 2018, 10 Pages.
"Non Final Office Action Issued in U.S. Appl. No. 15/637,606", dated Sep. 26, 2018, 8 Pages.

(56) References Cited

OTHER PUBLICATIONS

"Office Action Issued in Indian Patent Application No. 1572/DEL/2005", dated Jun. 15, 2018, 3 Pages.
"Non Final Office Action Issued in U.S. Appl. No. 15/351,572", dated Mar. 21, 2019, 14 pages.
"Office Action Issued in Mexican Patent Application No. PA/a/2005/007081", dated Jun. 10, 2010, 6 Pages. (W/o English Translation).
"Office Action Issued in European Patent Application No. 05108658.5", dated Oct. 20, 2017, 6 Pages.
"Final Office Action Issued in U.S. Appl. No. 15/351,572", dated Oct. 2, 2019, 9 Pages.

* cited by examiner

EDITING THE TEXT OF AN ARBITRARY GRAPHIC VIA A HIERARCHICAL LIST

CROSS-REFERENCE TO RELATED APPLICATIONS

This application is a divisional application of U.S. patent application Ser. No. 13/933,390 (now U.S. Pat. No. 9,489,359), entitled "EDITING THE TEXT OF AN ARBITRARY GRAPHIC VIA A HIERARCHICAL LIST," filed on Jul. 2, 2013, which application is a continuation application of U.S. patent application Ser. No. 10/957,103 (now U.S. Pat. No. 8,510,657), filed on Sep. 30, 2004, the entire disclosures of which are hereby incorporated herein by reference.

TECHNICAL FIELD

The present invention relates generally to the creation and editing of graphical presentations. More particularly, the present invention relates to the creation of visual presentations in computer graphics applications or programs.

BACKGROUND OF THE INVENTION

Visual aids help people understand information. Conveying information to or among groups of people almost necessarily requires creating visual presentations. These visual presentations generally provide graphical content to the user's choice of media, e.g. text or audio. Computer programs, such as the Microsoft® PowerPoint® presentation application, have helped automate the task of creating such graphical content. Such graphics programs generally allow users to convey information more efficiently and effectively by putting that information in easily understandable formats and contexts.

Graphical content contains information that can have both textual and graphical characteristics. Textual characteristics generally refer to the written matter within the graphical content. Graphical characteristics generally refer to the pictorial or other visual features of the graphical content. Depending on the information and the audience, the user generally determines a visual diagram that will best teach or convey the underlying information. Then, the user tries to create the diagram that the user has decided to use. Unfortunately, creating graphical content in prior art graphics applications and programs can be extremely cumbersome and time consuming.

Graphics programs and applications generally create visual diagrams in less user-friendly processes. The graphics programs generally force the user to create a diagram piece by piece. In other words, the user must select and place every graphical element within the presentation. Once an element is in the diagram, the user can edit the element for format and content. The user enters any text into or onto the element. The user changes the shape, position, size, or other formatting. When the user needs to add more information to the presentation, the user must add more elements and edit those elements for their content and visual appearance. As the diagram grows in complexity, the diagram may require changes to previously added elements to accommodate newer elements. The process of creating a diagram generally requires a great deal of time to manipulate the diagram to manufacture a final presentation. In addition, the process is very awkward for the user because the user must determine which diagram to use before creating the diagram. If the user does not first determine a diagram to create, the user could spend even more time redrawing the diagram before settling on a final presentation. Eventually, the user stops focusing on the diagram's message but gets caught up in how the diagram looks.

SUMMARY OF THE INVENTION

The present invention relates to a novel graphics software application or program. The graphics application comprises embodiments directed toward a user interface and methods for creating and/or editing graphical content from content information and graphical definitions.

A user interface having aspects of the present invention may comprise a provision for or display of a plurality of graphical definitions, a content entry area, and a drawing canvas. Embodiments of the user interface can receive content in the content entry area and present the graphical content in the drawing canvas. The graphical content is the visual presentation and may be rendered according to the content received in the content entry area. The user interface, in some embodiments, may also comprise a live preview of the graphical content before presenting the graphical content in the drawing canvas. A method for creating a graphical content having aspects of the present invention can comprise receiving content from the user, providing a user with a plurality of graphical definitions to be combined with the content to create the graphical content, and automatically creating the graphical content based on the content. A method for editing graphical content having aspects of the present invention can comprise presenting the graphical content, where the graphical content is created according to content in a content entry area and a choice from a plurality of graphical definitions, receiving one or more changes to the graphical content, and automatically modifying one or more elements of the graphical content according to the one or more changes as the one or more changes are received.

In embodiments of the present invention, the content can include textual data or text content. In other embodiments, the content may comprise one or more formats to textual data that cause one or more changes to the appearance of the graphical content. In further embodiments, the content may be a hierarchical list. To provide content, the user may, in one embodiment, copy and paste content into the content entry area. In other embodiments, the user may type the content into the content entry area or link the content to information in the graphics application or some other application or program. In some embodiments, some of the content in the content entry area is not displayed in the drawing canvas. In still other embodiments, the graphical content is automatically created in the drawing canvas as the content is received in the content entry area.

In one embodiment, the graphical application can receive a choice of a graphical definition from the display of the graphical definitions and present the graphical content according to the choice of graphical definition. In other embodiments, the graphical content is based on the content and a default graphical definition. In other embodiments, the graphical definitions may be presented to the user as a list containing text descriptions or groups of visual examples, such as thumbnails.

In further embodiments, the user can make edits in the user interface. The user interface can receive one or more changes to the graphical content and automatically modify one or more elements of the graphical content according to the one or more changes. In embodiments of the present invention, the changes to the graphical content are displayed as the one or more changes are received. In one embodiment, the one or more changes are to the content in the content entry area. In another embodiment, the one or more changes is a new choice from the plurality of graphical definitions, and the new graphical content is created according to the new choice of graphical definition and the content. In some embodiments, the one or more changes are directed to the graphical content in the drawing canvas and the changes are reproduced in the content in the content entry area.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, and to the following detailed description of exemplary embodiments of the invention, and to the appended claims.

DETAILED DESCRIPTION OF THE INVENTION

The present invention will now be described more fully hereinafter with reference to the accompanying drawings, in which embodiments of the invention are shown. The invention may however, be embodied in many different forms and should not be construed as limited to the embodiments set forth herein. Rather, these embodiments are provided so that the disclosure will be thorough and complete and will fully convey the scope of the invention to those skilled in the art.

In general, the present invention relates to a method of creating graphical content. The methods allow a user to specify graphics properties separate from content properties. User specified graphics properties establish the type and overall style of the graphical content, while the format of the content helps create the layout and style of the graphical content. In accordance with embodiments of the present invention, the methods described herein may be executed as a set of computer instructions read and performed on a single, stand-alone computer system.

The invention may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Figure 1A:
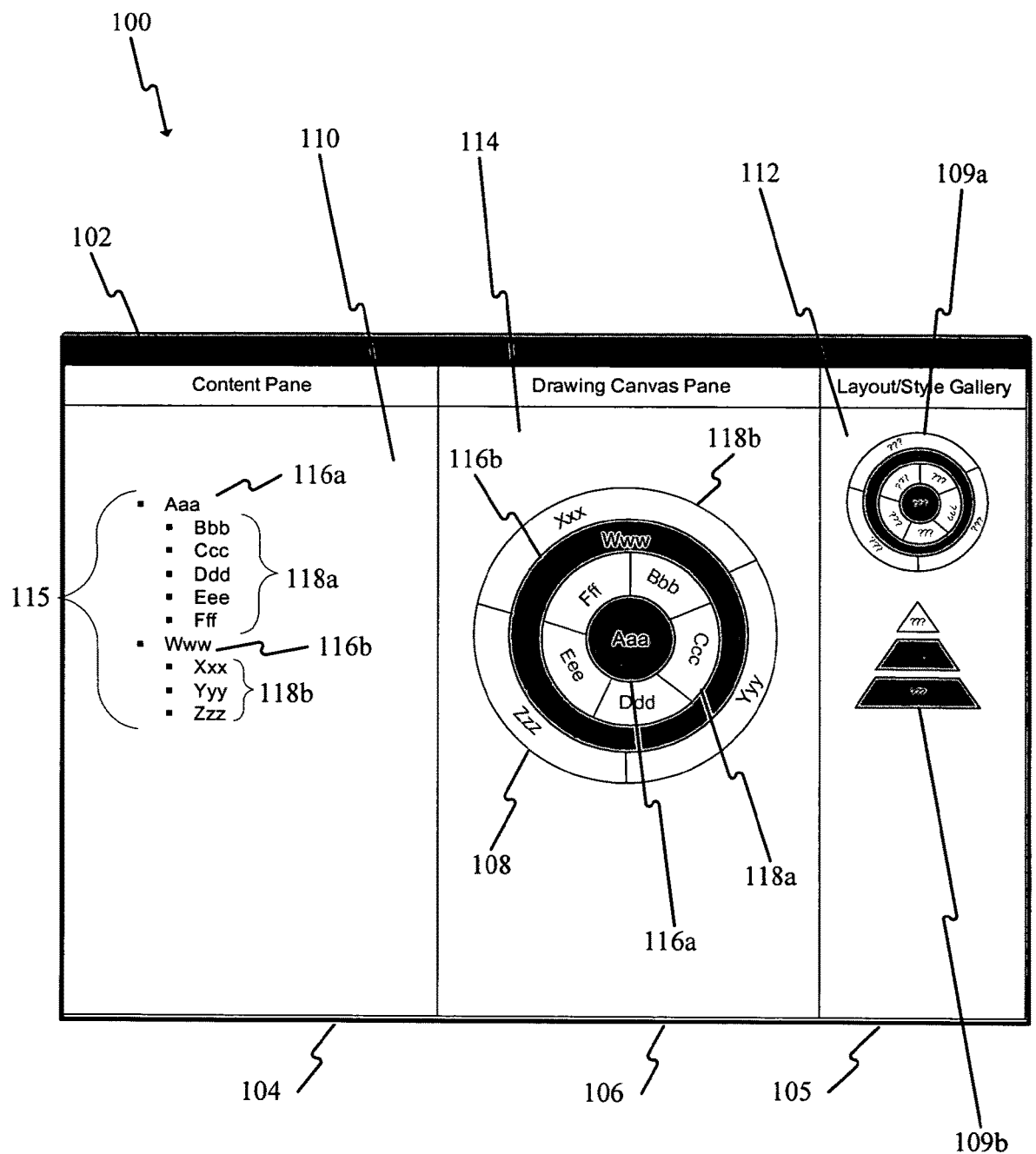
FIG. 1A, FIG. 1B, and FIG. 1C are embodiments of a user interface illustrating the system the user can interact with to create a visual presentation according to the present invention.

An exemplary embodiment of a graphics application 100, having aspects of the present invention, is shown in FIG. 1A. The graphics application 100 can automatically create graphical content, like graphical content 108. The graphical content can be rendered and displayed in another area, such as pane 106. Graphical content refers to a visual representation of an idea. Graphical content can be a visual presentation, such as a diagram. The graphical content is a combination of the content, which is explained below, and a graphical definition, which is also explained below. In one embodiment, graphical content may be composed of several graphical elements. A graphical element, also referred to as an element, refers to a part of the displayed graphical content. In embodiments of the present invention, graphical elements may include, but are not limited to, nodes, transitions, callouts, or Stuff On Page (SOP), like clipart. A node can be one of the shapes within the graphical content. Examples of nodes may include circles, squares, triangles, or parts of shapes, like segments. One skilled in the art will recognize different types of nodes. A transition is a graphical representation of an interrelation between nodes. The transition typically is a line, arrow, or other shape connoting a relationship between two nodes. The other elements are described more fully below.

In some embodiments, the graphical application 100 can create the graphical content 108 as the user enters the content, like content 115. The present invention allows a user to enter content into an entry area, such as pane 104. Content refers to the information presented in the graphical content. Basically, the content is the idea that the graphical content is trying to convey. In some embodiments, content may be textual, such as a hierarchical list of ideas that have interrelationships. The content may convey information both with the text and by the format of the text, such as carriage returns, tabs, or other syntactic formats. In other embodiments, content can include information that is not textual, such as pictures, videos, sounds, or other audio-visual materials.

In further embodiments, the user can choose graphical definitions, such as graphical definitions 109*a* and 109*b*, from another entry area, such as pane 105. The graphical definitions can create or change the visual style or appearance of the graphical content. When combined with the content, the graphical definition helps create the graphical content. A graphical definition refers to the visual characteristics of the visual presentation. In embodiments of the present invention, the graphical definition comprises a presentation definition and a style definition. A presentation definition refers to the information about the geometric and/or layout properties of the graphical elements. In some embodiments, the presentation definition can comprise information about shape position, shape sizing, organization of the shapes, and other layout properties for the graphical elements. A style definition refers to information about the graphical properties for the graphical elements of the graphical content. In embodiments of the present invention, graphical properties can comprise font size, font type, line, fill, and other such properties. The type and number of graphical elements may be defined by a graphical definition and the format of the content.

In one embodiment, the graphical application 100 allows the user to switch between numerous and various graphical definitions and apply the same content to the chosen graphical definition without needing to recreate the content. Thus, the present invention allows for automatic creation of graphical content based on one of a plurality of graphical definitions and based on the content. There is no need to create separately each element of the graphical content. Also, a plurality of diagrams can be created using the same content.

In one embodiment of the present invention, the user interface 102 may include, but is not limited to, three panes 104, 105, and 106 in a single window 102. In other embodiments, the user interface 102 may have two or more separate windows. In still further embodiments, the display of the windows may consist of selectable features, menus, thumbnails, or other graphical user interface components. In embodiments of the present invention, the user interface 102 may comprise a content entry area 110, one or more galleries 112, and a drawing canvas 114.

In embodiments of the present invention, the content entry area 110 can allow the user to enter content 115. A "content entry area," as used herein, is a window, a windowpane, outline view class, or other display area that allows the user to input content. A content pane, such as pane 110 shown in FIG. 1A, is an embodiment of the content entry area. Content 115 may consist of any information that the user may convey. In some embodiments, the content 115 can be textual, such as a list, as shown in content entry area 110. In further embodiments, the content 115 may have one or more formats. A format is a syntactic characteristic that may include, but is not limited to, carriage returns, indents, bullets, or line spacing. Formats can help create or change the substance, structure, arrangement, organization, or appearance of the graphical content. For example, carriage returns may create new elements within the graphical content. Blank lines of text may form empty elements. Indents may create interrelationships between elements. One skilled in the art will recognize how other formats may create other changes in the graphical content. The textual information and the formats may form a particular embodiment of the content 115, such as a hierarchical list, as shown in the content entry area 110.

In some embodiments, the content entry area 110 is a content pane, as shown in user interface 102. Content 115 may be entered into the content entry area 110. In one embodiment, the user can type content 115 into the content entry area 110. In other embodiments, the user may copy content data from another program, another area in the graphics application, another window, or other area and paste that content data into the content entry area 110 or onto the drawing canvas 114, which will create content 115 in the content entry area 110. In still another embodiment, the user may link the content 115 within the content entry area 110 to another application or program, such that as the content data in the other program is created or changes, the content 115 within the content entry area 110 will automatically appear or change. In still other embodiments, the user may manually refresh the linked data, such that the user forces the content data to update in the content entry area rather than having the graphics application or other program update automatically. In still other embodiments, the user may request and receive content data from another program, like a database. In some embodiments, the data from the other program will not update.

In embodiments of the present invention, the user interface can comprise graphics areas. A graphics area is a window, a windowpane, a graphics view class, or other display area that allows the user to visualize and edit the graphical content. A drawing canvas, a layout & style gallery, and a "live preview" display are embodiments of the graphics area. The galleries, such as gallery 112, provide a plurality of graphical definition choices 109. The galleries can provide the user with an area to create or change the visual characteristics of the graphical content. The visual characteristics describe every aspect of the appearance of any part, component, or item within the graphical content. Visual characteristics may include, but are not limited to, shape, color, size, configuration or arrangement, position, font characteristics. Graphical definitions are the visual characteristics assigned to elements of the graphical content. In embodiments of the invention, the graphical definitions may comprise presentation definitions and style definitions. Presentation definitions can define the type, the organization, and/or the elements of the diagram or the visual presentation. For example, a choice of flowchart or organization chart can be a presentation definition. The style definitions can define the visual appearance of the elements created by the presentation definition. For example, style definitions can comprise element shape, color, size, font characteristics, etc.

In the present embodiment, the user interface provides a simplified gallery 112. The gallery can comprise a layout definition gallery, displaying presentation definitions, and a style definition gallery, displaying style definitions. The present exemplary embodiment only provides a layout gallery. Only two choices for presentation definitions 109*a* and 109*b* are shown in the present embodiment. However, the present invention is not limited to this embodiment, but the present invention may present the user with any number of graphical definitions from which to choose. The first layout selection 109*a* is a wheel diagram. The second choice 109*b* is a pyramid diagram. The current examples, of the layout choices, are shown as thumbnails. In other embodiments, the presentation definitions may include a menu or list of descriptive names that allow the user to choose a name from the list. One skilled in the art will recognize other ways of presenting the presentation definitions that are included in the present invention. In some embodiments, the presentation definition may comprise a default presentation definition.

Figure 1B:
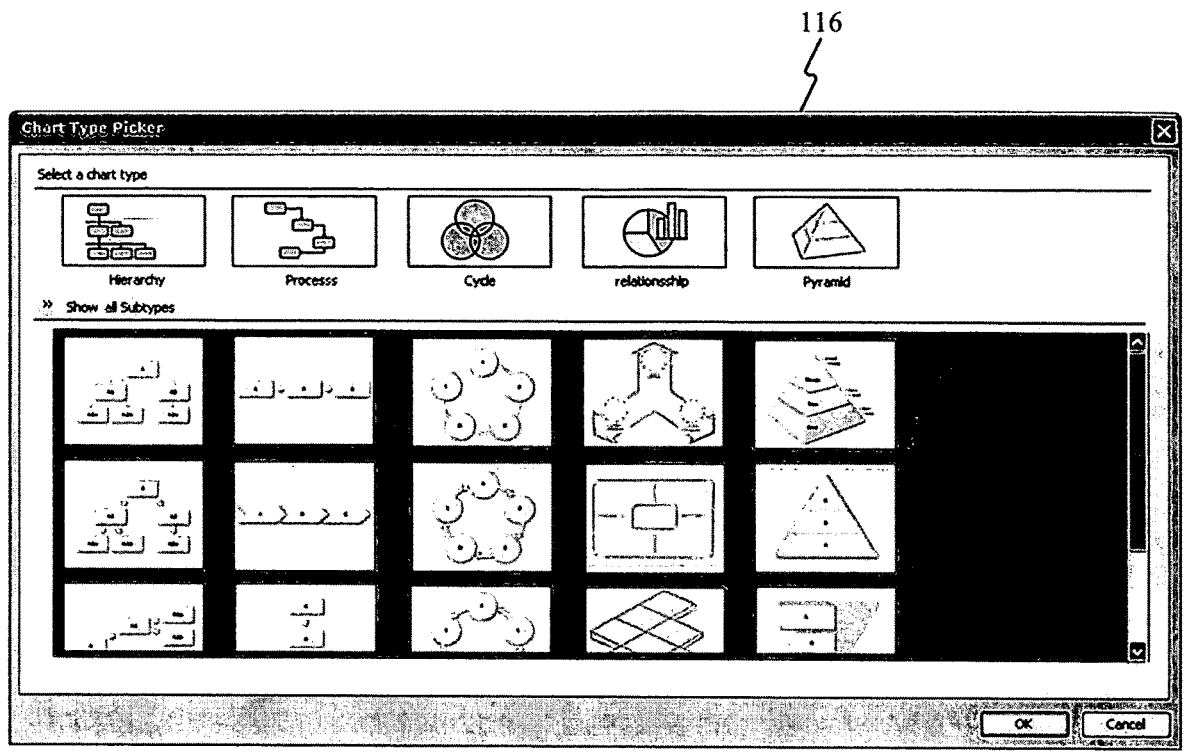

Another exemplary embodiment of a layout gallery 116 having aspects of the present invention is shown in FIG. 1B. In the embodiment, the user may choose from several broad categories of diagram type and from several types of diagrams within the broad categories. A selection of a presentation definition can create graphical content having default or simple visual characteristics. For example, if the user chooses an organizational chart, the diagram may have simple black lines, simple shapes, no fill in any shape, and simple connectors between the shapes. To change the visual characteristics, the user may, in some embodiments, use the style gallery.

The exemplary embodiment depicted in FIG. 1A, does not show a gallery for style definitions. The style gallery may provide a user with several views, windows, menus, or other graphical user interface components for choosing or modifying the style definitions. In embodiments, the user may make changes to or selections of visual characteristics for the graphical content. In some embodiments, the user can make global changes to the elements of the graphical content through the style galleries. For example, the user can use the style gallery to change every element shape in a diagram from a square to a circle. In some embodiments, the user may make changes to specific elements or sets of elements within the graphical content. In some embodiments, the style definitions may comprise one or more default visual definitions for graphical elements within the graphical content.

Figure 1C:
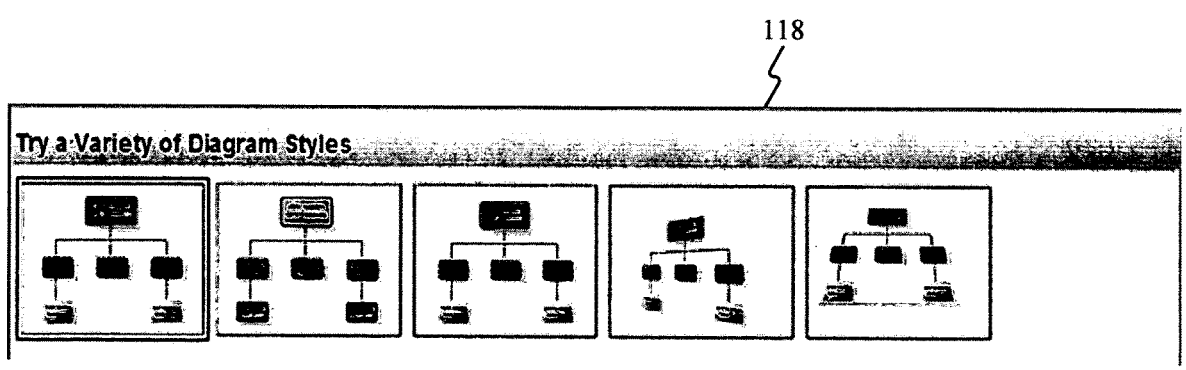

An exemplary embodiment of a style gallery 118 having aspects of the present invention is shown in FIG. 1C. In embodiments of the present invention, the choices made in the style gallery may effect all, some, or one of the elements in the graphical content. In the exemplary embodiment, the user may choose from several different organizational charts having various visual characteristics. As the exemplary embodiment demonstrates, the style gallery can provide fill, line, shape, or other visual definitions for one or more elements in the graphical content. If the user wishes to make changes to one or more elements within the graphical content, the user may make those changes, in some embodiments, within the drawing canvas.

In embodiments of the present invention, the drawing canvas 114 displays the rendered graphical content created from the content and graphical definitions. The drawing canvas 114 presents the graphical content 108 to the user. The drawing canvas may be a separate pane, window, or other graphical user interface component. In some embodiments, the user may begin to create a diagram in the drawing canvas. In other embodiments, the user chooses or is provided with a graphical definition, which the drawing canvas immediately displays without any content or with a set of sample content. In still other embodiments, the user can begin to enter content into the content entry area without choosing a graphical definition. The drawing canvas, in these embodiments, can provide the user with a default choice for the graphical definition. Thus, when the user starts creating any content, the drawing canvas may display default graphical content that changes as the user continues to add content. In other embodiments, the user may make edits, whether to the content or the visual characteristics, in the drawing canvas. Inputs into the drawing canvas can create changes in the content pane and/or the galleries.

In the exemplary embodiment depicted in FIG. 1A, the user has entered particular content 115 in the form of a hierarchical list. In addition, the user has selected a wheel diagram graphical definition 109a. The drawing canvas 114 automatically displays the graphical content based on the choice of the wheel diagram 109a and based on the hierarchical list 115. The process of creating the graphical content based on the graphical definition and the content will be explained in more detail hereinafter.

In the exemplary embodiment in FIG. 1A, the user may choose the wheel diagram 109a as the starting graphical definitions. In other embodiments, the graphical application 100 may provide the wheel diagram 109a as a default graphical definition. The user can select the content entry area and begin to enter content. The first line of a list the user may enter, by typing or otherwise, may be the line 116a called "Aaa." Entering the "Aaa" line creates a first element in the graphical content. In this example, the first line creates layer one in the drawing canvas wheel diagram 116a. The line of text in the content and the element in the graphical content are related. The user may then enter a next line of text. When the user enters the carriage return to create the next line of text, a next layer may appear in the graphical content. As the text is entered in area 110, the text in the content entry area also appears in the second layer of the wheel diagram in the graphical content of drawing canvas pane 114. When the user enters the indent in the content in the content entry area, the graphical application 100 can recognize that a parent/child relationship is created between the content in the first line of text and the content in the second line of text. Thus, the graphical content creates a segment in the second layer of the wheel diagram for each child element. As the user enters an indented line of text, a segment of layer two of the wheel diagram can be created. This graphical content creation process continues as new lines of text create new elements in the graphical content and indented lines create parent/child relationships.

The exemplary embodiment of the hierarchical list has two lines of text 116, "Aaa" and "Www," that are higher in order and may form parent elements in some diagrams. In embodiments of the present invention, the position of display for a graphical element depends on the type of presentation definition. For instance, a higher order line of content may be at the bottom of some diagrams and at the top of other diagrams. In the exemplary embodiment, the first parent line of text 116a has five children 118a that are represented as a series of indented lines of text. The second parent line of text 116b has three children 118b that are shown as three lines of indented text. The content in the content entry area determines the structure and appearance of the elements shown in the drawing canvas. For example, the first layer of the wheel diagram is the first parent 116a, with its children 118a surrounding the first layer 116a as a set of four segments. The third layer 116b is the second parent 116b. Finally, the children 118b of the second parent 116b surround the third layer 116b as a set of segments. Thus, the text is the textual content within the layers, and the formats within the hierarchical list 115 create the graphical content's structure.

In embodiments of the present invention, if a user changes the structure of the content, the display of the graphical content can change. For instance, if the second line of the hierarchical list has its indent removed, a new layer would be created in the wheel diagram between the first layer and the first layer's children. The change would mean that the children segments would become children of the second line of text, and thus, would become children of the second layer in the graphical content shown in the drawing canvas. Also, changes in any one of the different components of the user interface may create changes in the other components. The graphical application 100 can display user-entered changes in separate panes, e.g., panes 110 and 114, as the changes occur, regardless of where or how the change is entered.

Figure 2:
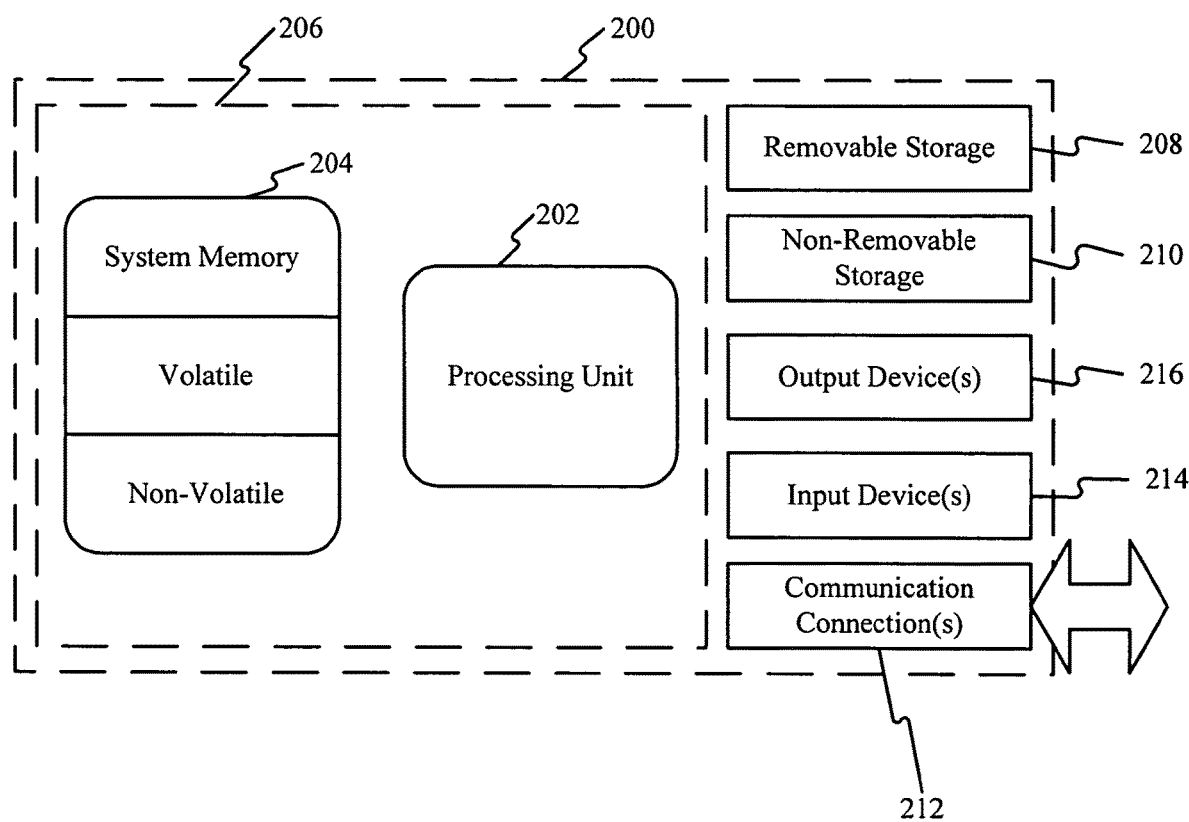
FIG. 2 is a functional diagram illustrating a computing environment and a basic computing device that can operate the graphics creation system according to the present invention.

An example of a suitable operating environment in which the invention may be implemented is illustrated in FIG. 2. The operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

With reference to FIG. 2, an exemplary system for implementing the invention includes a computing device, such as computing device 200. In its most basic configuration, computing device 200 typically includes at least one processing unit 202 and memory 204. Depending on the exact configuration and type of computing device, memory 204 may be volatile (such as RAM), non-volatile (such as ROM, flash memory, etc.) or some combination of the two. The most basic configuration of the computing device 200 is illustrated in FIG. 2 by dashed line 206. Additionally, device 200 may also have additional features/functionality. For example, device 200 may also include additional storage (removable and/or non-removable) including, but not limited to, magnetic or optical disks or tape. Such additional storage is illustrated in FIG. 2 by removable storage 208 and non-removable storage 210. Computer storage media includes volatile and nonvolatile, removable and non-removable media implemented in any method or technology for storage of information, such as computer readable instructions, data structures, program modules, or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 200. Any such computer storage media may be part of device 200.

Device 200 may also contain communications connection(s) 212 that allow the device to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media.

Device 200 may also have input device(s) 214 such as keyboard, mouse, pen, voice input device, touch input device, etc. Output device(s) 216 such as a display, speakers, printer, etc. may also be included. The devices may help form the user interface 102 discussed above. All these devices are well know in the art and need not be discussed at length here.

Computing device 200 typically includes at least some form of computer readable media. Computer readable media can be any available media that can be accessed by processing unit 202. By way of example, and not limitation, computer readable media may comprise computer storage media and communication media. Combinations of the any of the above should also be included within the scope of computer readable media.

The computer device 200 may operate in a networked environment using logical connections to one or more remote computers (not shown). The remote computer may be a personal computer, a server computer system, a router, a network PC, a peer device or other common network node, and typically includes many or all of the elements described above relative to the computer device 200. The logical connections between the computer device 200 and the remote computer may include a local area network (LAN) or a wide area network (WAN), but may also include other networks. Such networking environments are commonplace in offices, enterprise-wide computer networks, intranets, and the Internet.

When used in a LAN networking environment, the computer device 200 is connected to the LAN through a network interface or adapter. When used in a WAN networking environment, the computer device 200 typically includes a modem or other means for establishing communications over the WAN, such as the Internet. The modem, which may be internal or external, may be connected to the computer processor 202 via the communication connections 212, or other appropriate mechanism. In a networked environment, program modules or portions thereof may be stored in the remote memory storage device. By way of example, and not limitation, a remote application programs may reside on memory device connected to the remote computer system. It will be appreciated that the network connections explained are exemplary and other means of establishing a communications link between the computers may be used.

Figure 3:
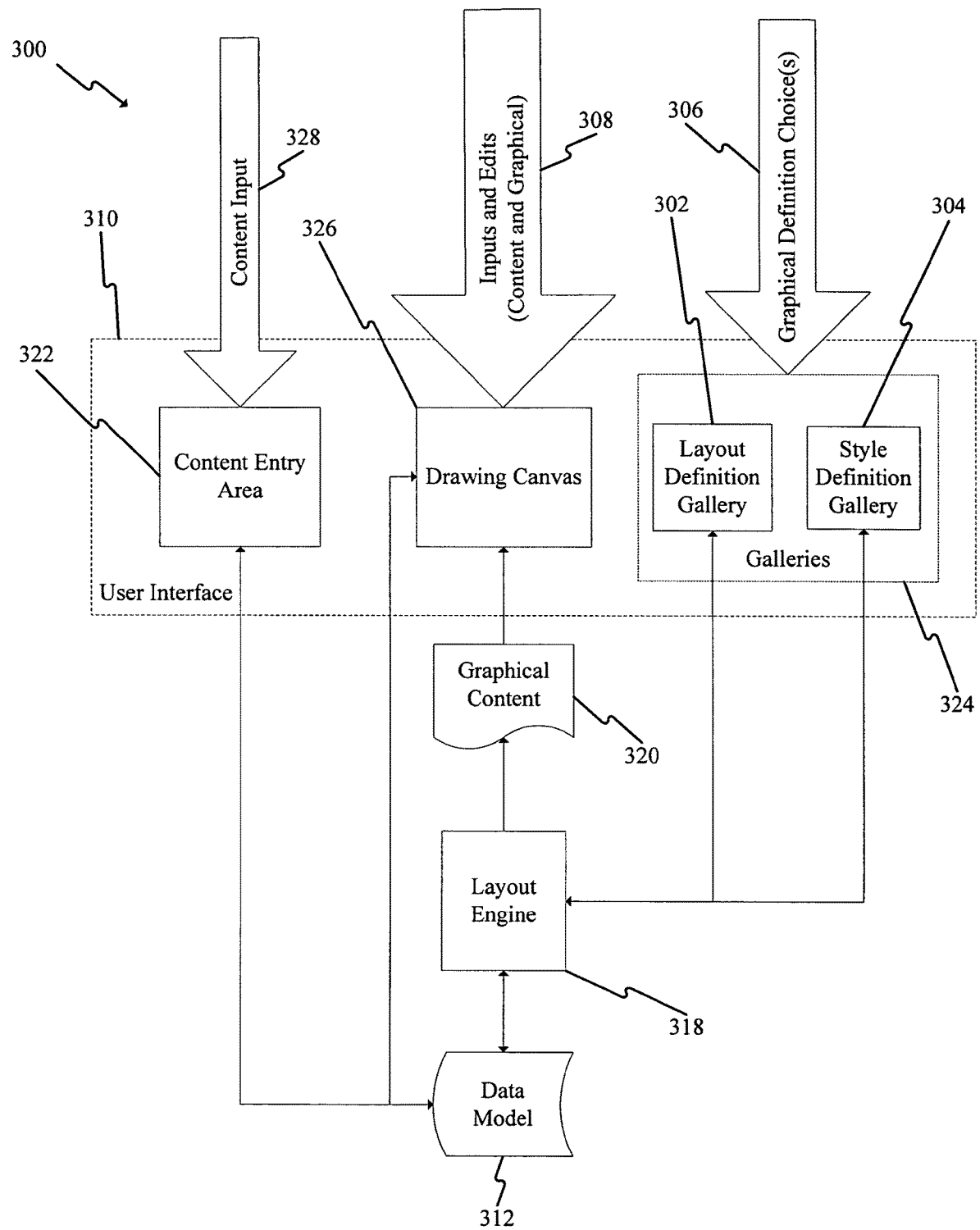
FIG. 3 is a functional diagram to an embodiment of the present invention illustrating the components of a graphics application.

An embodiment of the graphical application 300 having aspects of the present invention is shown in a functional diagram in FIG. 3. The graphical application 300 comprises a user interface 310, a data model 312, a layout engine 318, and graphical content 320. Graphical content 108 depicted in FIG. 1A is an embodiment of graphical content 320. Graphical content 320 can be one or more elements having visual characteristics and/or content. In embodiments of the present invention, graphical content 320 comprises nodes and transitions, as discussed in connection with FIG. 1A. The graphical application components may be formed in a single software program that does not have the divisions shown. To explain the graphical application 300 simply, the embodiment of the present invention is presented to allow for description of the functions of the graphical application components.

In embodiments of the present invention, the user interface 310 provides the user with the ability to input and edit the content and graphical characteristics of the graphical content 320. User interface 102 depicted in FIG. 1A is an embodiment of user interface 310. In one embodiment, the user interface 310 may include any input device and any display device that creates a man/machine interface. The user interface 310, in one embodiment, may be a graphical user interface, such as the Windows® environment provided by Microsoft® Corporation.

The user interface 310 may comprise any number of views both of the content and the graphics of the graphical content 320. The user interface 310 may include, but is not limited to, a content entry area 322, galleries 324, and a drawing canvas 326. The content entry module 322 can provide the user with the ability to create or enter content 328 into the data model 312. A data model 312 refers to a collection of stored properties relating to the elements of the graphical content 320. A description of an embodiment of the data model 312 is provided below.

In embodiments of the present invention, the content entry area 322 comprises a pane in a window or a separate window in a graphical user interface 310. Content entry area 110 depicted in FIG. 1A is an embodiment of content entry area 322. The user can input any type of content 115 into the content entry area 322. Content 115 depicted in FIG. 1A is an embodiment of content 328. In exemplary embodiments, the content 328 is a hierarchical list. The text of the hierarchical list can create the words or text of any nodes or transitions defined in the data model 312 and displayed with the graphical content 320. In embodiments of the present invention, the content does not change depending on the type of visual presentation, rather the graphical content 320 remains based on the content regardless of the user's choice of graphical definitions.

The formats or the syntactic presentation of the content 328 can be ordered or organized to create differences in the graphical content 320. For instance, depending on the graphical definitions, a carriage return in the list may create a new node, while an indent that immediately follows the carriage return may create a parent/child relationship between two nodes. Double spacing the list may create unfilled nodes. An indent may also create a transition. The hierarchical format of the list can define the hierarchy of elements, the organization of elements, and/or the layout of elements in the data model 312. In other embodiments, formats may comprise the formatting of the text, such as bold, font color, underline, and other formats. For example, changing the font size of the content in the content entry area 322 may change the size of shapes within the graphical content 320. The data model objects may be of several types. For example, a data model object can be a node, transition, callout, SOP, image, or other object. In some embodiments, an icon in the content entry area 322 could describe the data model object type. For instance, a circle icon could represent a node while an arrow could represent a transition. The user may change the data model object type by changing the icon type. For instance, if a data model object was a node, the user could make that content entry's icon an arrow to change the data model object to a transition. A change in the data model object can create a different type of graphical element within the graphical content 320. For example, if the data model object type went from a node to a transition, an element in a flowchart may transform from a step in the flowchart to an exchange between two steps. One skilled in the art will recognize other formats that can be used with the present invention.

In embodiments of the present invention, the galleries 324 provide the user with the ability to input, choose, or change the graphical definitions or visual characteristics 306 defined in the data model 312. Galleries 112, 116, 118 depicted in FIG. 1A, FIG. 1B, and FIG. 1C are embodiments of galleries 324. The galleries 324 may include, but are not limited to, a presentation definition gallery 302 and a style definition gallery 304. The presentation definition gallery 302 can provide the user with a plurality of presentation definitions from which to choose. The plurality of presentation definitions comprises a set of different types of visual presentation or diagrams including, but not limited to, flowcharts, circle diagrams, organization charts, pie charts, and other diagram models. Any type of diagram or visual presentation may be used in the present invention. The user can select a presentation definition to define the layout in the data model 312. Selecting the presentation definition may require the user to choose the presentation definition from a menu, a windowpane, a separate window, or other graphical user interface component. Regardless, the user can choose from many different presentation definitions.

In embodiments of the present invention, the style definition gallery 304 allow the user to input, choose, or change the visual characteristics 306 of one or more elements or features of the graphical content 320. Any visual characteristic of the graphical content 320 may be changed, including, but not limited to, the size of a shape, the orientation of a shape, the color of a shape, the placement of a shape, the type of shape, the type of transition, the shape of the transition, the color of the transition, and/or font characteristics. Thus, the user can modify the appearance of both the nodes and the transitions as defined in the data model 312 and displayed with the graphical content 320. The galleries 324 provide the presentation definitions and the style definitions that are incorporated into the data model 312.

In embodiments of the present invention, the drawing canvas 326 is a display of the rendered graphical content 320. Drawing canvas 114 depicted in FIG. 1A is an embodiment of drawing canvas 326. The drawing canvas 326 can present the rendered graphical content 320 from the data model 312. In further embodiments, the drawing canvas 326 can accept user edits or inputs 308 that may update the data model 312. For instance, the user can change the text in a node, which will update the data model 312 for that node. Thus, if the user wanted a node that included a bulleted list to have another entry, the user could add that extra line in the bulleted list in the drawing canvas 326. In other embodiments, the user may change the layout or style definitions of the graphical content 320, which will update the data model 312. A user may also begin to create graphical content 320 in the drawing canvas 326 rather than the content entry area 322 or the galleries 324, and thus, the user begins to form the data model 312 with entries in the drawing canvas 326.

In one embodiment, the user interfaces 310, including the content entry area 322, galleries 324, and drawing canvas 326, all display changes to the data model 312, regardless of where those changes are made. Thus, as edits are made in any one part of the user interface 310, those edits may be shown in all or some of the other parts of the user interface 310. For instance, if the user enters content 328 into the content entry area 322 those changes are shown in the drawing canvas 326 and the galleries 324. Likewise, if the user makes a change in the drawing canvas 326, those changes are shown in the content 328 in the content entry area 322 or in the selections highlighted in the galleries 324. For example, if the user changes the color of some text in the content entry area 322, the node in the drawing canvas 326 may change color and the representation of that node in the style definition gallery 304 may also change color. In further embodiments, any user action within any user interface component can be displayed as the action occurs in any other user interface component. Thus, the user need not finish an entry to see the final product. Rather, the different elements of the user interface 310 may update as the changes are made. For example, elements of the graphical content 320 are created and the textual content within those elements is displayed as the user enters format and text content into the content entry area 322. In other embodiments, if a user selects an item in one view, the item may be highlighted in several views. For example, if a user selects a shape in the drawing canvas 326 with the mouse, the shape in the drawing canvas 326 may appear highlighted and the line of text in the content entry area 322 may appear highlighted.

In some embodiments of the present invention, one or more of the user interface components do not display all the data model information. As an example, the content entry area 322 may include content that is part of a node within the drawing canvas 326. However, the node may be hidden behind another node in the drawing canvas 326. Therefore, while the content 328 is updated and presented in both the drawing canvas 326 and the content entry area 322, only the content entry area 322 actually displays the textual information. In another embodiment, the content 328 within the content entry area 322 may have more textual data than can be shown in the chosen graphical definition. For instance, some graphical definitions may have only two nodes. In these situations, any textual data that would normally form a third parent node may not be shown in the drawing canvas 326. In one embodiment, a line may appear in the hierarchical list between the text creating the second parent and the third parent connoting that the information below the line cannot be shown in the drawing canvas 326. However, if the user changes the graphical definition to a diagram with more than two nodes, the text forming the third node may be shown in the drawing canvas 326. The two examples just described highlight some advantages of the present invention. First, the user can make changes to the content in the graphical content 320 without having to edit individual elements within the drawing canvas 326. The changes are automatically made for the user in the canvas 326 when the changes are entered in the content pane 322. Second, the content in the content entry area 322 can be applied to any number of graphical definitions, even if the content is not normally suitable to the particular graphical definition.

In further embodiments of the present invention, the user interface 310 provides a "live preview" area. The live preview area may be a separate windowpane or a separate window. The live preview window may provide the user an example of what the graphical content 320 would look like before committing to any changes in the drawing canvas 326 or in the data model 312. The live preview display shows what will be in the drawing canvas 326 if the user accepts one or more experimental changes.

In embodiments of the present invention, the layout engine 318 takes the graphical definitions and content 328 from the data model 312 and render the graphical content 320. In essence, the layout engine 318 can use the content 328 to create the required number of nodes and transition. The layout engine 318 renders the graphical content 320 by applying the syntactic information to the presentation definition to create the elements, applying the style definitions to the layout to create the visual characteristics of the elements, and applying the textual information to the elements to create the information within the elements. In some embodiments, the textual information may also create layout definitions for particular shapes. For example, a bulleted list may have a certain layout and appear in one shape as specified by the user. In embodiments of the present invention, the graphical content creation process is automatic. In other words, the layout engine 318 creates the graphical content 320 with only the content from the user. Once the layout engine 318 renders the information within the data model 312, the layout engine 318 can send the graphical content 320 to the drawing canvas 326 in the user interface 310. Methods of creating and editing graphical content 320 are described in more detail below. The layout engine is described more fully in related application Ser. No. 10/957,103, entitled, "METHOD, SYSTEM, AND COMPUTER-READABLE MEDIUM FOR CREATING AND LAYING OUT A GRAPHIC WITHIN AN APPLICATION PROGRAM," filed on Sep. 30, 2004, which is incorporated by reference herein.

In embodiments of the present invention, the graphical application 300 may be embodied in a client/server environment. A user may input information in a client computer system, which can send the information to a server graphical application. A user may input a presentation and/or style definitions and content. The client computer system may send the definitions and content to a server computer system. In other embodiments, the content may be linked to content information existing at the server, and thus, the client computer system need not send content to the server computer system. Thus, the content and graphical definitions may be input into the graphical application from the client computer system or the server computer system. The server graphical application may execute the layout engine 318, which provides the graphical content 320. The server computer system can send the graphical content 320 to the client computer system to be displayed at the client's user interface 310. In addition, the server graphical application may provide the galleries 324 or other information within the user interface components. One skilled in the art will recognize how the graphical application 300 may be embodied in the client/server environment.

The data model 312 is a stored collection of all the characteristics of the graphical content 320. Although not necessary, all user inputs and any defaults generated by the graphical application 300 can be stored in the data model 312. The data model 312 can provide the layout engine 318 with the relevant information necessary to render the graphical content 320. A description of an embodiment of the data model 312 is provided below.

In embodiments of the present invention, the data model 312 comprises information about a set of graphical elements, the relationships between those elements, and other properties. The graphical elements roughly correspond to the lines of text within the content entry area 322. In embodiments of the present invention, elements can be callouts, SOP, nodes, or transitions. The information about relationships describes how the elements interact. For example, if a second line of text in the content entry area 322 is indented, the element corresponding to the second line of text is a "child." The relationship in this example is a parent/child relationship.

Figure 4:
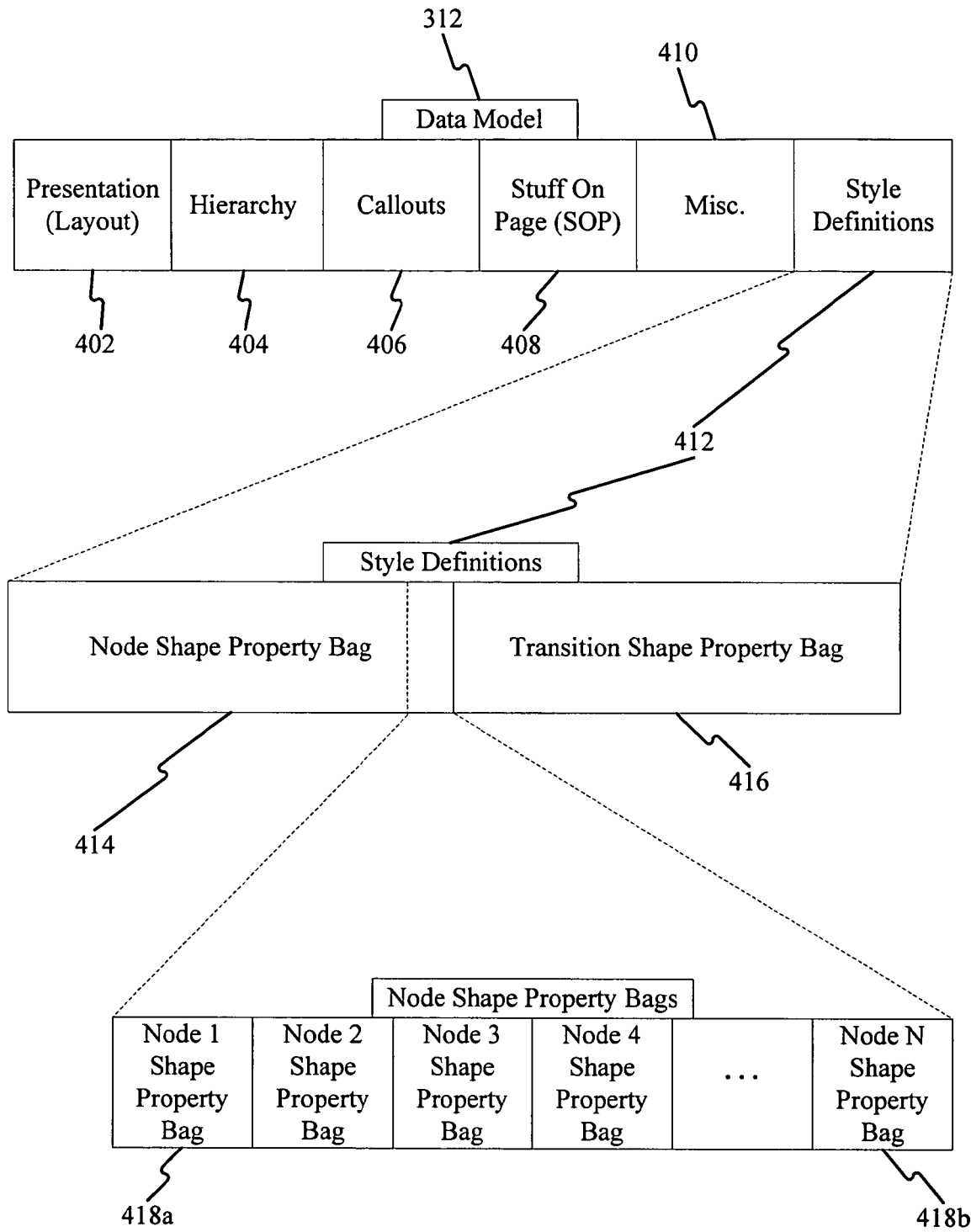
FIG. 4 is a data diagram representing an embodiment of a data model used to describe graphical content in the present invention.

An embodiment of a data model 312 having aspects of the present invention is shown in FIG. 4. In embodiments of the present invention, the data model 312 may comprise data that describes the presentation definition (also referred to as the layout definition) 402 of the graphical content 320, the hierarchy 404 of the graphical content 320, the callouts 406 within the graphical content 320, SOP 408, miscellaneous 410 information, and the style definitions 412 of the graphical content 320. The presentation definition 402, as described earlier, comprises the layout selections chosen by the user or, in some embodiments, the default presentation definition 402. For example, the presentation definition 402 may be a flowchart or a circle diagram. The hierarchy 404 is the information about the organization of the content 328, the graphical content 320, and the relationships, such as parent/child relationships, between elements in the content 328 and the graphical content 320. For instance, the hierarchy 404 may contain the list of nodes determined by the number of carriage returns in the content 328, the list of transitions also determined by carriage returns in the content 328, the list of children nodes determined by indented text in the content 328, and other information. The callouts section 406 in the data model 312 comprises information about callouts 406. In some embodiments, the callout information may comprise the text of the callouts 406, the shape of the callouts 406, the position of the callouts 406, or the size of the callouts 406. SOP 408 includes any graphical content 320 that is not part of the graphical definitions. For example, clip art can be SOP 408. A user may place clip art into the graphical content 320. SOP 408 within the data model 312 would contain the information about such clip art, like the clip art file, the position of the clip art, size of the clip art, configuration of the clip art, and other information about the clip art. A miscellaneous section 410 may contain data about various other content or graphical elements that are not covered in the other areas.

The final section of the data model 312 may be the style definitions 412. The presentation definition 402 and hierarchy 404 may create some of the visual changes to the graphical content 320. Yet, a user may create many customizations to the graphical content 320 by changing the style definitions 412 of the graphical content 320. As explained above, style definitions 412 may change various shape properties of the graphical content 320. A shape property refers to a characteristic of an element in the graphical content 320. In embodiments of the present invention, the shape properties may include, but are not limited to, color, size, configuration, position, type, shading, text type, text font, or text size. In embodiments of the present invention, the style definitions 412 may be separated into two types of shape property bags. A "shape property bag" (SPB), as used herein, refers to a collection of shape properties for an element or elements within the graphical content 320. In one embodiment, the shape property bag defines the finite set of properties used to render the shapes. Some examples of the properties stored in a SPB may include path, fill style, line style, shadow style, and bounds. In one embodiment, one shape property bag 414 may hold style definitions 412 for the nodes and another shape property bag 416 may hold style definitions 412 for the transitions. Each shape property bag may have one or more style definitions 412 that are common to two or more nodes. In addition, the data model 312 may contain one or more shape property bags 418 specific to certain elements within the graphical content 320, whether nodes, transitions, or other elements. An example of the data model 312 arrangement is shown in FIG. 4, where the node shape property bag 414 may include numerous individual shape property bags 418 starting at a first shape's property bag 418a and ending at the Nth shape property bag 418b. The arrangement of information within the data model 312 can provide for a minimum amount of stored information.

Figure 5:
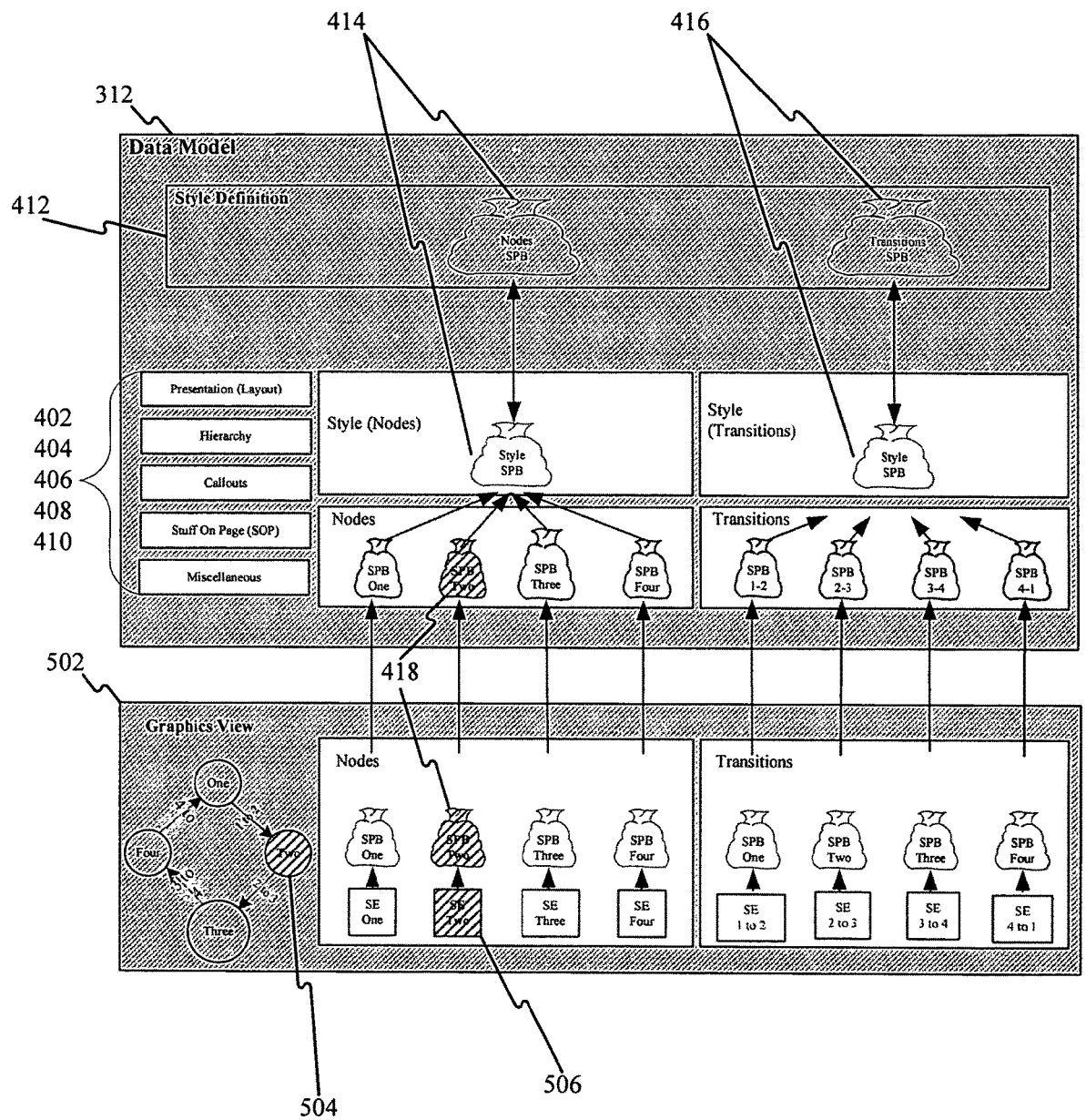
FIG. 5 is another diagram representing another embodiment of a data model used to describe the graphical content in the present invention.

In embodiments of the present invention, the data model 312 may only store one instance of properties shared by numerous graphical elements. The layout engine 318 uses the single instance of the property to give the several graphical elements the shared style. The sharing of properties may be referred to as inheritance. An exemplary embodiment of a data model 312 having aspects of the present invention is shown in FIG. 5. The exemplary embodiment will present examples of inheritance and how the data model 312 functions. Here, the graphical content 320 is shown at the left of a graphics view 502. The graphics view 502 simply describes any user interface component that can change the visual characteristics of the graphical content 320. As explained above, in embodiments of the present invention, the user may define or change the visual characteristics of the graphical content 320 in the content entry area 322, the galleries 324, or the drawing canvas 326. The data model 312 is shown at the top of FIG. 5. The list of data model 312 components includes those parts 402, 406, 408, and 410 previously described and the style definitions 412. The style definitions 412 are also shown at the top of the data model 312 of FIG. 5. In some embodiments, as explained above, two shape property bags, the node shape property bag 314 and the transition shape property bag 416, can form the style definitions 412.

A user may override the look, and therefore the style definitions 412, of any node within a graphics view 402. In this example, the user has applied a crosshatch fill to the node 504. Scene element two 506, which is a visual representation of the rendered display of the information within the shape property bag 418 for node two, shows a crosshatch fill for node two 504. The node 504 is a graphical element with its own shape property bag 418. The node's individual properties are stored in the shape property bag 418. The crosshatch property is stored in the individual shape property bag 418 within the data model 312.

Yet, node two 504 may share many of the same properties with the other nodes, like shape type (circle), shape size, etc. These common properties are not stored in the individual shape property bags, 418a through 418b as seen in FIG. 4, for each of the nodes. Rather, the node shape property bag 414 maintains the common or shared style definitions 412, which the layout engine 318 can use for all nodes having the common property when rendering the graphical content 320. In embodiments of the present invention, to determine what any node should look like, the layout engine 318 takes a property, such as fill, and searches the particular node's shape property bag 418. If the individual shape property bag 418 does not contain a user-override, the layout engine 318 can use the fill pattern found in and linked into the node shape property bag 414 as the default fill pattern for the node. If any node has an override in the individual shape property bag 418, the layout engine 318 uses the overridden property instead of the common property. For example, if the individual shape property bag 418 contains a separate fill pattern, the layout engine 318 uses the individual fill pattern, e.g. the crosshatch fill for the node 504. Any changes to the presentation definition 402, hierarchy 404, or content that may change the graphical content 320 may not change the individual fill pattern for the node. Thus, if the user switches presentation definitions 402, the graphical element in the new diagram that corresponds to node 2 504 can maintain the crosshatch fill pattern.

Figure 6:
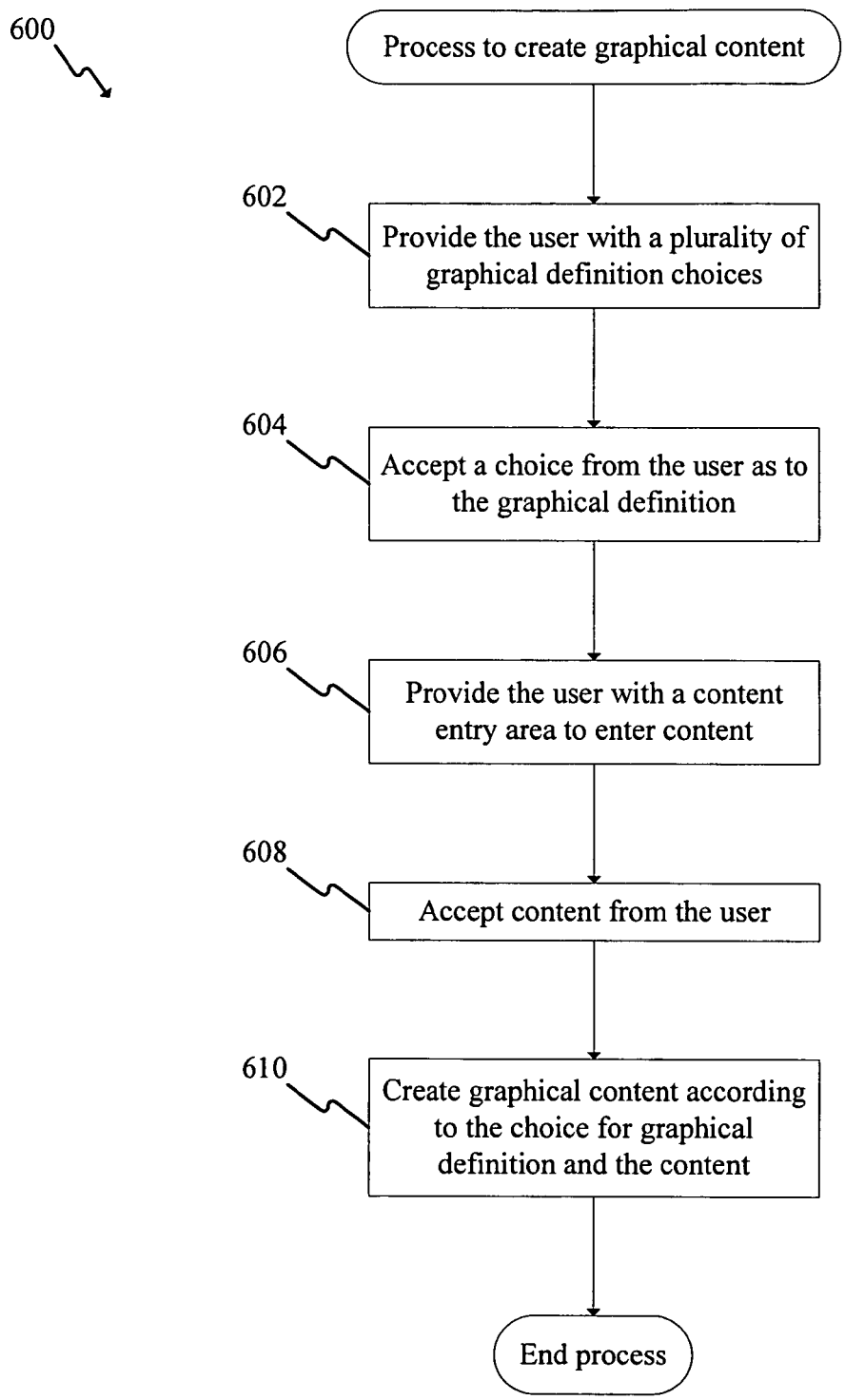
FIG. 6 is a flow diagram representing an embodiment of the present invention for creating graphical content.

An embodiment of a method 600 for creating graphical content (such as graphical content 320) having aspects of the present invention is shown in FIG. 6. A provide operation 602 provides the user with a plurality of graphical definitions (such as graphical definitions). In some embodiments, the plurality of graphical definitions may be displayed in a gallery (such as gallery 324) for the user to select. Next, accept operation 604 accepts a selection of a graphical definition. In one embodiment, the user makes the selection by clicking a mouse on a graphical definition in the gallery, which the graphical application accepts. The selection can help identify the presentation definition (such as presentation definition 402). In addition, the selection may also identify style definitions (such as style definitions 412) for the graphical content. The selected graphical definition may be displayed in the drawing canvas (such as drawing canvas 326). In some embodiments, while graphical definitions may be provided, the user may not make a selection at first. Rather, the graphical application may provide a default graphical definition. Thus, the user may begin to enter content without first choosing a graphical definition. The default graphical definition may be the same for every instance the user tries to create graphical content or may change according to the content entered.

Next, provide operation 606 provides an area to enter content. In one embodiment, a content entry area (such as content entry area 322) is displayed. The content entry area may be a windowpane or separate window. The user may select the content entry area and begin to provide content (such as content 328). An accept operation 608 accepts the content. In some embodiments, the accept operation 602 accepts the content to the data model (such as data model 312). In one embodiment, the user may type the content into the content entry area. In other embodiments, the user may cut the content from another program and paste the content into the content entry area. In still other embodiments, the user may link to the content data or information or input the content data or information from another program or another area of the graphics application. The linked data may be manually or automatically updated, such as by a refresh, to provide more current information for the graphical content. In some embodiments, the content may include both text and formats, such as carriage returns or indents. The textual content may update the shape property bags (such as SPB 418) of different graphical elements. The formats may create the hierarchy (such as hierarchy 404). Thus, in some embodiments, the graphical application may translate the formats into a list of parent nodes, children nodes, transitions, and other graphical elements.

Next, the create operation 610 creates graphical content. In some embodiments, a layout engine (such as layout engine 318) generates graphical content. The layout engine can create the nodes and transitions according to the hierarchy and the layout. The textual content may be placed within the nodes and transitions. Style definitions may be applied to the various graphical elements. In some embodiments, the graphical content is sent to the drawing canvas for display on a display device. The drawing canvas can display any nodes, transitions, SOP, callouts, or miscellaneous items in the graphical content. In some embodiments, the graphical content is displayed in the drawing canvas as the content is being received in the content entry area. Thus, the user can see the diagram being created as the user types in textual data or makes format changes to the content. One skilled in the art will recognize that the process of creating graphical content can be repeated at any of the aforementioned operations. In addition, the process may not be linear but may jump around the different operations.

Figure 7:
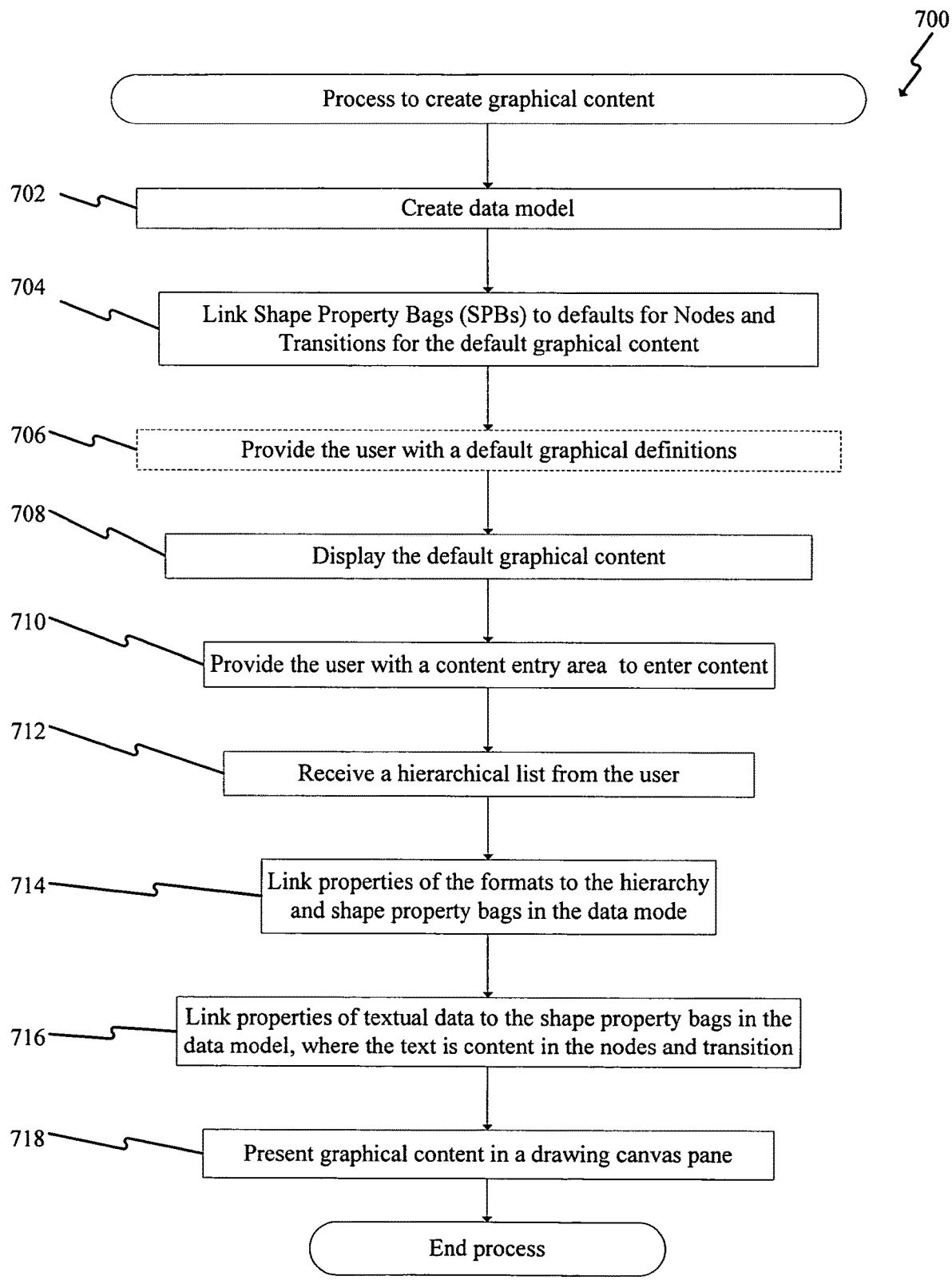
FIG. 7 is a flow diagram representing another embodiment of the present invention for creating graphical content using default graphical definitions.

Another embodiment of a method 700 for creating graphical content is shown in FIG. 7. A create operation 702 creates a data model (such as data model 312). In embodiments of the present invention, the data model can store the information produced while the user is creating the visual presentation. In one embodiment, a data structure is created in memory for the storage of the data model information.

Next, a link operation 704 links the SPBs (such as SPB 414 or 416) to default graphical definitions. In some embodiments, the graphical application provides a default presentation definition (such as presentation definition 402). For instance, an initial diagram is chosen, such as a flowchart. In other embodiments, default style definitions 412 (such as style definitions 412) are also set. For example, shape, line, fill, and other properties are set. Forcing a choice for a default presentation definition 402 may prevent "writer's block" that can afflict some users when trying to create graphical content (such as graphical content 320).

Next, an optional provide operation 706 provides the default graphical definitions. In some embodiments, the default graphical definition selected by the graphical application may be shown in the gallery (such as gallery 324). In other embodiments, the graphical application may provide a text message or prompt describing the default graphical definitions. In other embodiments, the default graphical definition is not shown or described but may be used in the drawing canvas.

Next, the display operation 708 displays the default graphical definitions. In one embodiment, a diagram is shown in the drawing canvas (such as drawing canvas 326). The diagram may have the visual characteristics defined by the default definitions. Thus, the default diagram may have the layout and visual properties of the default presentation definition and default style definitions.

Next, a provide operation 710 provides a content entry area (such as content entry area 322). As explained above, the content entry area may be a separate window or windowpane where the user can enter content (such as content 328). In one embodiment of the present invention, the content is a hierarchical list. A receive operation 712 receives the content, such as the hierarchical list. The hierarchical list can have two parts, a set of text and one or more formats. As such, the hierarchical list can be used to modify and update the default graphical content.

Next, a link operation 714 links properties of the graphical content to the format of the content. In some embodiments, the format of the text helps create the hierarchy (such as hierarchy 404). Thus, the number of nodes, their organization, and the transitions are determined. The nodes and transitions inherit the properties of the style shape property bag (such as SPB 412) filled with the default settings.

Next, a link operation 716 links properties of the textual data to the graphical content. In some embodiments, the text data is used to update the individual shape property bags (such as SPB 418). The text is stored in each node or transition's individual shape property bag. Thus, instead of a default property from the style shape property bag, each node or transition displays its individual text content. A present operation 718 presents the graphical content. In some embodiments, the graphical content, with the changes from the content entry area and graphical definitions, is shown in the drawing canvas. In one embodiment, as the user enters the content into the content entry area, the graphical content changes.

Figure 8:
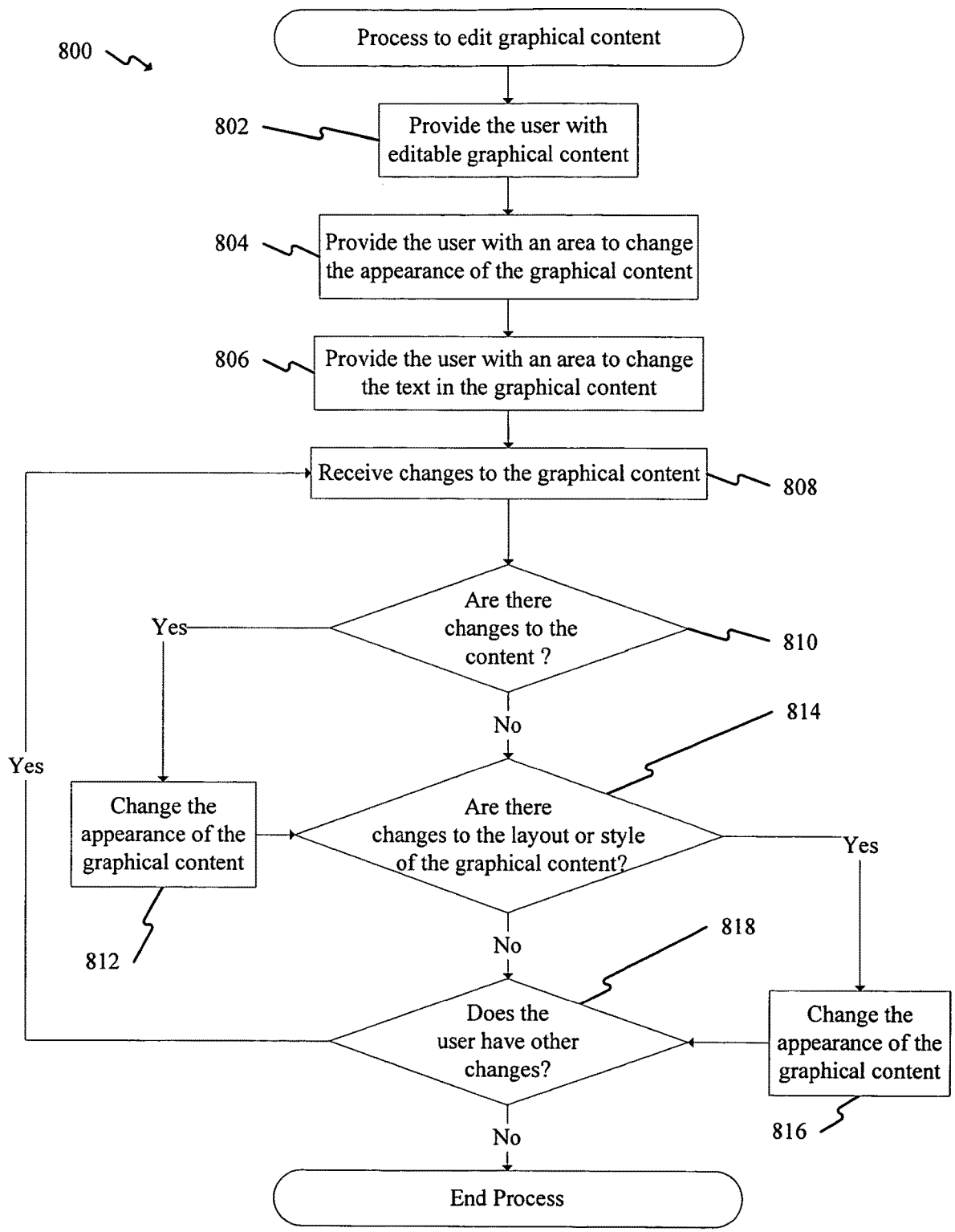
FIG. 8 is a flow diagram representing an embodiment of the present invention for editing graphical content.

In many embodiments, after the initial graphical content is created, the user may go through a reiterative process of editing the graphical content to create the final graphical presentation the user desires. An embodiment of a method 800 for editing graphical content having aspects of the present invention is shown in FIG. 8. A provide operation 802 provides editable graphical content. In some embodiments, the user has created graphical content (such as graphical content 320) and that graphical content appears in the drawing canvas (such as drawing canvas 326). In other embodiments, the user may retrieve graphical content and import that graphical content into the drawing canvas. In still other embodiments, the user may download graphical content from the Internet or a server. In one embodiment, the graphical content may come from another file or application. Regardless, graphical content can be presented in the drawing canvas for the user to edit.

Next, a provide operations 804 provides one or more areas to change the graphical appearance of the graphical content. In some embodiments, the drawing canvas may by one such area where the user can change the graphical appearance of the graphical content. In other embodiments, the user may also be provided with one or more galleries (such as gallery 324). The galleries may allow the user to edit the layout of the graphical content or the style definitions (such as style definition 412) of the graphical content.

Next, a provide operation 806 provides an area to change the content (such as content 328). In some embodiments, the user may be provided with one or more areas to change the content of the graphical content. Again, the drawing canvas may be used to change the content within one or more graphical elements. In another embodiment, the user may be provided with a content entry area (such as content entry area 322) where the user can edit the text or format of the content.

Next, a receive operation 808 receives an edit to the graphical content. In one embodiment, the graphical application must then determine the type of edit. In some embodiments, the graphical application receives a change to the graphical content via the user interface.

A determine operation 810 determines if the change are to the content. In some embodiments, a content change can be either a text or a format change to the content within the graphical content. In some embodiments, the determine operation 810 can determine if the changes were made in a content entry area. If the change was made in the content entry area, the changes were to the content, and the determine operation 810 may determine if the change was to the text or formatting. If the changes were to the format of the content, the determine operation 810 may determine if the changes added a new node or transition, eliminated a node or transition, merged two nodes or two transitions together, changed a node to a transition, changed a transition to a node, converted one node or transition into two nodes or transitions, or other such change. For example, a new node or transition may be created if the user created a new line of text or placed a carriage return into the list. The determine operation 810 can determine if the change in the format of a hierarchical list made any changes to the structure or organization of the nodes or transitions.

In other embodiments, the determine operation 810 determines if the changes were made in the drawing canvas. The graphical application may determine if the change was in the drawing canvas. A user can edit any part of the graphical content, including the content and graphical elements, in the drawing canvas. If the changes were made in the drawing canvas, the determine operation 810 may determine if the changes were to a graphical element or to the content. If the changes were to the content, such as changes to the text of a node or transition, the process 800 may proceed to change operation 812.

If a change to the content has been made, a change operation 812 changes the appearance of the graphical content. A content change can create either a text change in an element or, if the format of the content has changed, a graphical structure or organization change. In other embodiments, changes to the content can cause changes to the properties of elements. For instance, changing the font color of a line of text can change the fill color of an element in the graphical content. Those changes to the text or the structure of the content create changes in the graphical content.

In some embodiments, if the determine operation 810 determines a new node or transition was created, the change operation 812 creates the new node or transition. In some embodiments, the change operation 812 can create a new shape property bag (such as SPB 418) for each new node and transition. The new shape property bags can be created within the data model. Thus, the number of local or individual shape property bags increases within the data model. The shape property bag may inherit the style definitions from the style shape property bag. However, if the user provided any local overrides, such as a custom font color or text, the local shape property bag may not inherit those properties.

In other embodiments, the change operation 812 changes the hierarchy. In some embodiments, the change operation 812 can change the hierarchy data (such as hierarchy 404) in the data model. The hierarchy data helps determine the arrangement and organization of the nodes and transitions. A change in the format of the content can create changes in the hierarchy. For instance, if the user moves a line of text representing a child under a first parent and sets the text under a different parent, no new node or transition may be added but the hierarchy or arrangement of the nodes and transitions changes. Thus, the change operation 812 can modify the hierarchy to account for such changes. In some embodiments, changing, in the drawing canvas, a bulleted list within an element of the graphical content can change the hierarchy of the bulleted list in the content entry area and the data model. In another embodiment, inserting a new shape into the drawing canvas, as a child node, can create a change in the hierarchy in the content entry area and the data model.

If the change is not to the content, a determine operation 814 determines if the changes are to the graphical definitions, such as the presentation definition or the style definitions. In some embodiments, the changes to the graphical definitions may be made in the galleries. In other embodiments, the changes may be made in the drawing canvas. As explained above, a user can edit any part of the graphical content, including the content and graphical elements, in the drawing canvas. If the changes were made in the drawing canvas, the determine operation 814 can determines if the changes were to a graphical element rather than to the content. If the changes were to the graphical elements, such as changing a shape or color of a node or transition, the process 800 may proceed to a change operation 816.

If the change was to the layout or style definitions in the galleries, a change operation 816 changes the appearance of the graphical content. In some embodiments, the determine operation 814 understands or determines that the changes, not in the drawing canvas or the content entry area, occurred in one of the galleries. A user can change the layout or style definition within the galleries. By choosing a new layout in a layout gallery, the user can change the presentation definition of the graphical content. By choosing a new style definition in a style gallery, the user alters the node shape, color, transition shape, etc. A change in the galleries can require an update to the layout or hierarchy in the data model. The changes may update the data in the data model that renders the layout of the nodes and transitions and the organization of those graphical elements within the graphical content. In other embodiments, a change in the drawing canvas can override the style definitions, like node fill color. In some embodiments, the changes to the graphical content may not be to the content or graphical definitions. For example, the user may inset SOP or callouts. The data model is updated with changes to these other graphical elements. In some embodiments, the changes appear in the content entry area.

The change operation 816 also changes the individual or local shape property bags of one or more elements within the graphical content. For instance, changing the text within a node, either in the drawing canvas or the content entry area, can create a change to the local shape property bag for that node. Likewise, changing the color of the node in the drawing canvas can change the data within the node's local shape property bag. The required changes are made to each local shape property bag.

In some embodiments, the nodes and transitions, especially the new nodes and the new transitions, can inherit the style properties from the style shape property bag. Thus, the nodes and transitions are standardized except for local overrides. The graphical application may then display the edited graphical content. The changes in the graphical content may be parsed into small edits. Thus, as the edits are made, those edits can be shown in the drawing canvas.

Next, a determine operation 818 determines if the user has other changes. If other changes have been made, the receive operation 808 receives the changes and the process 800 continues from the receive operation 808. In this way, each change can be made and presented to the user. In some embodiments, changes may be shown as they are made. Thus, as a user enters a character of text, the change is completed and the text is shown in the drawing canvas or, as one carriage return is made, the change is executed and a new node appears in the drawing canvas. The smallest change can be executed. By making changes iteratively, the changes appear in the drawing canvas as the changes occur. In one embodiment, a change in the graphical content is sent to the data model. The data model informs the other displays that a change has been made. The other displays in the user interface (such as user interface 310) respond by displaying the change.

In some embodiments, the determine operation 818 also determines if a Live Preview is displayed. A Live Preview, as explained above, is another pane or window that displays the affects of some selected change before the user commits to that change. For instance, the user can try several different layouts in the Live Preview without actually choosing a new layout. Thus, the user can experiment with the graphical content without altering the original graphical content displayed in the drawing canvas. The determine operation 818 can determine if the user desires to see a Live Preview. In some embodiments, the user can select a button or other graphical display that causes the graphical application to start the Live Preview. In other embodiments, the Live Preview may be automatically provided upon the selection of certain items, such as the layout gallery choices. In some embodiments, the user may express their desire for the Live Preview either by selecting the Live Preview or closing an automatically opened Live Preview.

The determine operation 818 also determines if the user commits to the changes. In some embodiments, if the change is presented in a Live Preview, the user may need to accept the changes. In other embodiments, the determine operation 818 may allow the user to make changes and then commit to a group of changes together. If the user does not commit to the changes, the edits to the layout, hierarchy, or local shape property bags may be deleted and the data model returned to its original state.

If the user does commit to the changes, the determine operation 818 updates local shape property bags. In some embodiments, any changes to the hierarchy 404, layout, or local shape property bags are finalized in the data model, and the data model may be stored. The local shape property bags provide any local overrides for individual graphical elements. Any other properties not overridden may be inherited from the style definitions in the style SPB.

Although the present invention has been described in language specific to structural features, methodological acts, and computer readable media containing such acts, it is to be understood that the present invention defined in the appended claims is not necessarily limited to the specific structure, acts, or media described. One skilled in the art will recognize other embodiments or improvements that are within the scope and spirit of the present invention. Therefore, the specific structure, acts, or media are disclosed as exemplary embodiments of implementing the claimed invention. The invention is defined by the appended claims.

What is claimed is:

1. A computer-implemented method for creating graphical content, comprising:
    receiving a first line of text and a second line of text in a list in a content pane;
    determining a hierarchical structure of the list;
    determining a hierarchical relationship between the first line of text and the second line of text based on the hierarchical structure of the list in the content pane;
    receiving a selection of a graphical layout definition; and
    automatically creating graphical content in a concurrently-displayed drawing pane without displaying the graphical content in the content pane, wherein the graphical content is automatically created based at least in part on the determined hierarchical relationship and the selected graphical layout definition, comprising:
        combining the first line of text with the graphical layout definition to generate a first shape;
        combining the second line of text with the graphical layout definition to generate a second shape;
        causing display of the first shape, wherein the first shape at least substantially encapsulates the first line of text;
        causing display of the second shape, wherein the second shape at least substantially encapsulates the second line of text; and
        causing display of a transition between the first shape and the second shape, the transition representing the hierarchical relationship between the first line of text and the second line of text.

2. The computer-implemented method of claim 1, further comprising:
    receiving one or more formats in addition to the first line of text and the second line of text, wherein the one or more formats comprise at least one of: a carriage return, an indent, a tab, a bullet, a text formatting, and a line spacing.

3. The computer-implemented method of claim 2, wherein determining a hierarchical relationship between the first line of text and the second line of text is based at least in part on the one or more formats.

4. The computer-implemented method according to claim 3, wherein one or more changes are displayed in the graphical content as the one or more formats are received to the first line of text and the second line of text.

5. The computer-implemented method according to claim 1, wherein the first line of text and the second line of text comprise a hierarchical list.

6. The computer-implemented method according to claim 1, wherein the first line of text and the second line of text are received when a user copies and pastes the first line of text and the second line of text into the content pane.

7. The computer-implemented method according to claim 1, wherein the first line of text and the second line of text are received when a user types the first line of text and the second line of text in the content pane.

8. The computer-implemented method according to claim 1, wherein the first line of text and the second line of text are linked to information in another application.

9. The computer-implemented method according to claim 1, wherein the graphical content is based on the first line of text and the second line of text and a default graphical layout definition.

10. The computer-implemented method according to claim 1, wherein the graphical layout definition is selected from a gallery area comprising a plurality of graphical layout definitions to be combined with the first line of text and the second line of text, wherein each of the plurality of graphical layout definitions defines a graphical layout for the graphical content.

11. The computer-implemented method according to claim 10, further comprising:
    receiving a graphical style definition from the gallery area comprising a plurality of graphical style definitions to be combined with the first line of text and the second line of text, wherein each of the plurality of graphical style definitions defines a graphical style for the graphical content.

12. The computer-implemented method according to claim 10, wherein the plurality of graphical layout definitions comprise one or more categories of diagrams, the one or more categories of diagrams comprising hierarchical diagrams, process diagrams, cycle diagrams, relationship diagrams, and pyramid diagrams.

13. The computer-implemented method according to claim 1, wherein a server computer system receives the first line of text and the second line of text, and wherein the server computer system automatically creates the graphical content to send to a client computer system.

14. A computer storage device having computer-executable instructions for performing steps comprising:
   receiving a first portion of content and a second portion of content in a content entry area;
   determining a hierarchical relationship between the first portion of content and the second portion of content;
   receiving a selection of a graphical definition;
   automatically creating graphical content in a concurrently-displayed drawing canvas area based at least in part on the determined hierarchical relationship and the selected graphical definition, wherein the drawing canvas area is separate from the content entry area, and wherein displaying the graphical content comprises:
      combining the first portion of content with the graphical definition to generate a first shape;
      combining the second portion of content with the graphical definition to generate a second shape;
      causing display of the first shape in the drawing canvas area without displaying the first shape in the content entry area, wherein the first shape at least substantially encapsulates the first portion of content;
      causing display of the second shape in the drawing canvas area without displaying the second shape in the content entry area, wherein the second shape at least substantially encapsulates the second portion of content; and
      causing display of a transition between the first shape and the second shape in the drawing canvas area, the transition representing the relationship between the first portion of content and the second portion of content.

15. The computer storage device of claim 14, further comprising:
   receiving one or more formats in addition to the first portion of content and the second portion of content, wherein the one or more formats comprise at least one of: a carriage return, an indent, a tab, a bullet, a text formatting, and a line spacing.

16. The computer storage device of claim 15, wherein determining the hierarchical relationship between the first portion of content and the second portion of content is based at least in part on the one or more formats.

17. The computer storage device according to claim 15, wherein one or more changes are displayed in the graphical content as the one or more formats are received to the first portion of content and the second portion of content.

18. The computer storage device according to claim 14, further comprising:
   receiving a modification to the first portion of content that is substantially encapsulated by the first shape in the drawing canvas area; and
   making a corresponding change to the first portion of content in the content entry area, wherein the corresponding change is made in the content entry area as the modification is received in the drawing canvas area.

19. The computer storage device according to claim 14, further comprising:
   receiving a change to the first portion of content in the content entry area; and
   making a corresponding modification to the first portion of content that is substantially encapsulated by the first shape in the drawing canvas area, wherein the corresponding modification is made in the drawing canvas area as the change is received in the content entry area.

20. A computer system comprising:
   a processor; and
   a memory storing computer instructions that when executed by the processor cause the computer system to:
      receive a first line of text and a second line of text in a list in a content pane;
      determine a hierarchical structure of the list;
      determine a hierarchical relationship between the first line of text and the second line of text based on the hierarchical structure of the list in the content pane;
      receive a selection of a graphical layout definition; and
      automatically create graphical content in a concurrently-displayed drawing pane without displaying the graphical content in the content pane, wherein the graphical content is automatically created based at least in part on the determined hierarchical relationship and the selected graphical layout definition, comprising:
         combine the first line of text with the graphical layout definition to generate a first shape;
         combine the second line of text with the graphical layout definition to generate a second shape;
         cause display of the first shape, wherein the first shape at least substantially encapsulates the first line of text;
         cause display of the second shape, wherein the second shape at least substantially encapsulates the second line of text; and
         cause display of a transition between the first shape and the second shape, the transition representing the hierarchical relationship between the first line of text and the second line of text.

* * * * *